US011150944B2

(12) United States Patent
Burke et al.

(10) Patent No.: US 11,150,944 B2
(45) Date of Patent: Oct. 19, 2021

(54) BALANCING MECHANISMS IN ORDERED LISTS OF DISPATCH QUEUES IN A COMPUTATIONAL DEVICE

(71) Applicant: INTERNATIONAL BUSINESS MACHINES CORPORATION, Armonk, NY (US)

(72) Inventors: Seamus J. Burke, Tucson, AZ (US); Trung N. Nguyen, Vail, AZ (US); Louis A. Rasor, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/680,598

(22) Filed: Aug. 18, 2017

(65) Prior Publication Data

US 2019/0056974 A1    Feb. 21, 2019

(51) Int. Cl.
  *G06F 9/48*   (2006.01)
  *G06F 9/50*   (2006.01)

(52) U.S. Cl.
  CPC .......... *G06F 9/4881* (2013.01); *G06F 9/5088* (2013.01); *G06F 2209/483* (2013.01)

(58) Field of Classification Search
  None
  See application file for complete search history.

(56) References Cited

U.S. PATENT DOCUMENTS

| 4,809,157 A | 2/1989 | Eilert et al. |
| 5,349,656 A | 9/1994 | Kaneko et al. |
| 5,465,335 A | 11/1995 | Anderson |
| 6,748,593 B1 * | 6/2004 | Brenner ................. G06F 9/5083 709/223 |
| 7,065,623 B2 | 6/2006 | Chen et al. |
| 7,093,258 B1 | 8/2006 | Miller et al. |
| 7,191,207 B2 | 3/2007 | Blount et al. |
| 7,290,099 B2 | 10/2007 | Budaya et al. |
| 8,676,748 B2 | 3/2014 | Budaya et al. |
| 8,732,439 B2 | 5/2014 | Lippett |

(Continued)

FOREIGN PATENT DOCUMENTS

CN    101986272 A    3/2011

OTHER PUBLICATIONS

Jeff Rasley, "Efficient Queue Management for Cluster Scheduling", 2016, EuroSys '16: Proceedings of the Eleventh European Conference on Computer Systems (Year: 2016).*

(Continued)

*Primary Examiner* — Wynuel S Aquino
(74) *Attorney, Agent, or Firm* — Konrad Raynes Davda & Victor LLP; Rabindranath Dutta

(57) ABSTRACT

A plurality of dispatch queues corresponding to a plurality of processing entities are maintained, wherein each dispatch queue includes one or more task control blocks or is empty, and wherein an ordered list of dispatch queues is maintained for each processing entity of the plurality of processing entities. A state for each of the plurality of dispatch queues is determined and the determined state is compared to a desired state for the plurality of dispatch queues. A task control block is moved from one dispatch queue to another dispatch queue, in response to the comparing of the determined state to the desired state for the plurality of dispatch queues.

14 Claims, 18 Drawing Sheets

(56) References Cited

U.S. PATENT DOCUMENTS

| | | | |
|---|---|---|---|
| 8,752,060 | B2 | 6/2014 | Hsieh et al. |
| 8,954,985 | B2 | 2/2015 | Edelstein et al. |
| 8,972,699 | B2 | 3/2015 | Lin et al. |
| 9,043,550 | B2 | 5/2015 | Benhase et al. |
| 9,058,217 | B2 | 6/2015 | Ash et al. |
| 9,158,713 | B1 | 10/2015 | Chudgar et al. |
| 9,201,598 | B2 | 12/2015 | Benhase et al. |
| 9,361,241 | B2 | 6/2016 | Benhase et al. |
| 9,658,888 | B2 | 5/2017 | Benhase et al. |
| 2002/0087618 | A1 | 7/2002 | Bohm et al. |
| 2002/0087736 | A1 | 7/2002 | Martin |
| 2002/0099752 | A1 | 7/2002 | Markos et al. |
| 2005/0210468 | A1 | 9/2005 | Chung et al. |
| 2006/0041780 | A1 | 2/2006 | Budaya et al. |
| 2007/0220517 | A1 | 9/2007 | Lippett |
| 2008/0133738 | A1* | 6/2008 | Knauerhase ............ H04L 51/04 709/224 |
| 2009/0222621 | A1 | 9/2009 | Ash et al. |
| 2010/0293353 | A1 | 11/2010 | Sonnier et al. |
| 2011/0107344 | A1 | 5/2011 | Kim et al. |
| 2012/0124214 | A1 | 5/2012 | Karger et al. |
| 2013/0167152 | A1 | 6/2013 | Jeong |
| 2013/0246561 | A1* | 9/2013 | Paramasivam ....... G06F 9/5088 709/217 |
| 2013/0247067 | A1* | 9/2013 | Schmit ................. G06F 9/4881 718/105 |
| 2013/0326537 | A1* | 12/2013 | Edelstein ............. G06F 9/4881 718/106 |
| 2014/0026141 | A1 | 1/2014 | Lippett |
| 2014/0082621 | A1 | 3/2014 | Fitzgerald et al. |
| 2014/0082629 | A1* | 3/2014 | Ash ....................... G06F 9/5088 718/105 |
| 2014/0207741 | A1 | 7/2014 | Morsi et al. |
| 2015/0220370 | A1 | 8/2015 | Ujibashi et al. |
| 2015/0261567 | A1 | 9/2015 | Kim et al. |
| 2015/0293794 | A1 | 10/2015 | Levin et al. |
| 2015/0301854 | A1 | 10/2015 | Park et al. |
| 2015/0309842 | A1 | 10/2015 | Wu et al. |
| 2016/0036879 | A1 | 2/2016 | Vadura et al. |
| 2016/0139953 | A1* | 5/2016 | Nguyen ................ G06F 9/5016 718/103 |
| 2016/0344817 | A1* | 11/2016 | Renzullo ............ H04L 41/0893 |
| 2017/0351545 | A1 | 12/2017 | Burke et al. |
| 2017/0351549 | A1 | 12/2017 | Burke et al. |
| 2017/0353396 | A1 | 12/2017 | Burke et al. |
| 2019/0138357 | A1 | 5/2019 | Burke et al. |
| 2019/0205168 | A1 | 7/2019 | Burke et al. |

OTHER PUBLICATIONS

Office Action dated Dec. 15, 2017, pp. 37, U.S. Appl. No. 15/172,846, filed Jun. 3, 2016.
Response dated Mar. 15, 2018, pp. 12, to Office Action dated Dec. 15, 2017, pp. 37, U.S. Appl. No. 15/172,846, filed Jun. 3, 2016.
Office Action dated Dec. 1, 2017, pp. 16, for U.S. Appl. No. 15/172,852, filed Jun. 3, 2016.
Response dated Mar. 1, 2018, pp. 12, to Office Action dated Dec. 1, 2017, pp. 16, for U.S. Appl. No. 15/172,852, filed Jun. 3, 2016.
U.S. Appl. No. 15/172,841, filed Jun. 3, 2016.
U.S. Appl. No. 15/172,846, filed Jun. 3, 2016.
U.S. Appl. No. 15/172,852, filed Jun. 3, 2016.
List of IBM Patents or Patent Applications treated as related dated Aug. 18, 2017, pp. 2.
English translation of Chinese patent CN101986272 dated Mar. 16, 2011.
Amendment dated May 2, 2018, pp. 10, for U.S. Appl. No. 15/172,852, filed Jun. 3, 2016.
Response dated Sep. 27, 2018, pp. 11, to Office Action dated Jun. 28, 2018, pp. 31, for U.S. Appl. No. 15/172,841.
Office Action dated Jun. 28, 2018, pp. 31, for U.S. Appl. No. 15/172,841.
Final Office Action dated Jul. 5, 2018, pp. 58, for U.S. Appl. No. 15/172,846.
Notice of Allowance dated May 22, 2018, pp. 32, for U.S. Appl. No. 15/172,852.
Notice of Allowance dated Sep. 12, 2018, pp. 18, for U.S. Appl. No. 15/172,852.
Notice of Allowance dated Nov. 21, 2018, pp. 13, for U.S. Appl. No. 15/172,841.
Response dated Oct 5, 2018, p. 13, to Final Office Action dated Jul. 5, 2018, pp. 58, for U.S. Appl. No. 15/172,846.
Notice of Allowance dated Dec. 19, 2018, pp. 13, for U.S. Appl. No. 15/172,846.
U.S. Appl. No. 16/239,194, filed Jan. 3, 2019.
List of IBM Patents and Patent Applications treated as related dated Jan. 4, 2019, pp. 2.
Patent Application for U.S. Appl. No. 16/283,553, filed Feb. 22, 2019, 66 pp. [18.643C1 (Appln)].
Patent Application for U.S. Appl. No. 16/297,453, filed Mar. 8, 2019, 62 pp. [18.644C1 (Appln)].
List of IBM Patents or Patent Applications Treated as Related, dated May 2, 2019, 2 pp.
Office Action 1 for U.S. Appl. No. 16/283,553, dated Dec. 30, 2019, 39 pp. [18.643C1 (OA1)].
Notice of Allowance 2 for U.S. Appl. No. 15/172,846, dated Jun. 12, 2019, 6 pp. [18.644 (NOA2)].
Final Office Action 1 for U.S. Appl. No. 16/283,553, 20 pp., dated Jul. 9, 2020. [18.643C1 (FOA1)].
Notice of Allowance dated Mar. 25, 2020, ,pp. 20, for U.S. Appl. No. 16/239,194.
Response dated Dec. 20, 2019, pp. 2, to Office Action dated Sep. 20, 2019, pp. 25, for U.S. Appl. No. 16/239,194.
Response to Office Action 1 for U.S. Appl. No. 16/283,553, dated Mar. 30, 2020, 12 pp. [18.643C1 (ROA1)].
Office Action 1 for U.S. Appl. No. 16/297,453, dated Feb. 17, 2021, 110 pp. [18.644C1 (OA1)].
Notice of Allowance dated Dec. 21, 2020, pp. 29, for U.S. Appl. No. 16/283,553.
Notice of Allowance dated Jan. 25, 2021, pp. 14, for U.S. Appl. No. 15/172,846.
Response to Final Office Action 1 for U.S. Appl. No. 16/283,553, 12 pp., dated Oct. 9, 2020. [18.643C1 (RFOA1)].
Office Action 3 for U.S. Appl. No. 15/172,846, 39 pp., dated Aug. 18, 2020. [18.644 (OA3)].
Response dated Nov. 18, 2020, pp. 10, to Office Action dated Aug. 18, 2020, pp. 39, U.S. Appl. No. 15/172,846.
Response to Office Action 1 for U.S. Appl. No. 16/297,453, dated May 17, 2021, 11 pp. [18.644C1 (ROA1)].
Final Office Action dated Jun. 8, 2021, pp. 21, for U.S. Appl. No. 16/297,453.
Notice of Allowance 1 for U.S. Appl. No. 16/297,453, dated Aug. 10, 2021, 10 pp.
Response dated Jul. 16, 2021, p. 2, to Final Office Action dated Jun. 8, 2021, p. 21, for U.S. Appl. No. 16/297,453.

* cited by examiner

BALANCING MECHANISMS IN ORDERED LISTS OF DISPATCH QUEUES IN A COMPUTATIONAL DEVICE

BACKGROUND

1. Field

Embodiments relate to balancing mechanisms in ordered lists of dispatch queues in a computational device.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores and the servers may share the workload of the storage system. In a two server configuration of the storage system, either server can failover to the other if there is a failure or a planned downtime for one of the two servers.

A computational device, such as a host or a server of storage system, may include a plurality of processors and form a multiprocessing system. Non-uniform memory access (NUMA) is a computer memory design used in multiprocessing, where the memory access time depends on the memory location relative to the processor. Under NUMA, a processor may access its own local memory faster than non-local memory (memory local to another processor or memory shared between processors). The benefits of NUMA may be limited to particular workloads, notably on servers where the data is often associated strongly with certain tasks or users. A task control block (TCB) is a data structure in an operating system or some other control program that includes the information needed to manage a particular process or a plurality of processes.

U.S. Patent Publication 2014/0026141 discusses a multi-core processor system and at least discusses dispatch queues associated with task control blocks. U.S. patent publication 2011/0107344 at least discusses a multi-core processor system which provides a method for load balancing. U.S. Pat. No. 9,058,217 at least discusses a preferential central processing unit (CPU) utilization for tasks, in which a set of like tasks to be performed is organized into a first group. Upon a determined imbalance between dispatch queue depths greater than a predetermined threshold, the set of like tasks is reassigned to an additional group. US Patent Publication 2010/0293353 discusses assignments of tasks to queues of a processing core. US Patent Publication 2015/0293794 discusses selection of a core for execution of a task in a multicore processor. China patent publication CN101986272A discusses a task scheduling method in a cloud computing environment.

SUMMARY OF THE PREFERRED EMBODIMENTS

Provided are a method, a system, a computer program product in which a plurality of dispatch queues corresponding to a plurality of processing entities are maintained, wherein each dispatch queue includes one or more task control blocks or is empty, and wherein an ordered list of dispatch queues is maintained for each processing entity of the plurality of processing entities. A state for each of the plurality of dispatch queues is determined and the determined state is compared to a desired state for the plurality of dispatch queues. A task control block is moved from one dispatch queue to another dispatch queue, in response to the comparing of the determined state to the desired state for the plurality of dispatch queues.

In additional embodiments, determining the state for each of the plurality of dispatch queues comprises determining an average wait time for task control blocks in each of the plurality of dispatch queues.

In further embodiments a number of task control blocks are moved from a first dispatch queue whose average wait time for task control blocks is greatest among the plurality of dispatch queues to a second dispatch queue whose average wait time for task control blocks is least among the plurality of dispatch queues.

In yet further embodiments, the number of task control blocks moved attempts to equalize the number of task control blocks in the first dispatch queue and the second dispatch queue.

The further embodiments, determining the state for each of the plurality of dispatch queues further comprises determining an arrival rate for task control blocks in each of the plurality of dispatch queues; determining an average number of task control blocks in each of the plurality of dispatch queues; and determining a service rate for task control blocks in each of the plurality of dispatch queues.

In certain embodiments a selected dispatch queue is allocated specifically to identified processing units that are resident on a same module.

In further embodiments a determination is made as to whether a primary dispatch queue of a processing entity is empty in an ordered list of dispatch queues for the processing entity. In response to determining that the primary dispatch queue of the processing entity is empty, a task control block is selected for processing by the processing entity from another dispatch queue of the ordered list of dispatch queues for the processing entity, wherein the another dispatch queue from which the task control block is selected meets a threshold criteria for the processing entity.

BRIEF DESCRIPTION OF THE DRAWINGS

Referring now to the drawings in which like reference numbers represent corresponding parts throughout.

DETAILED DESCRIPTION

Figure 1:
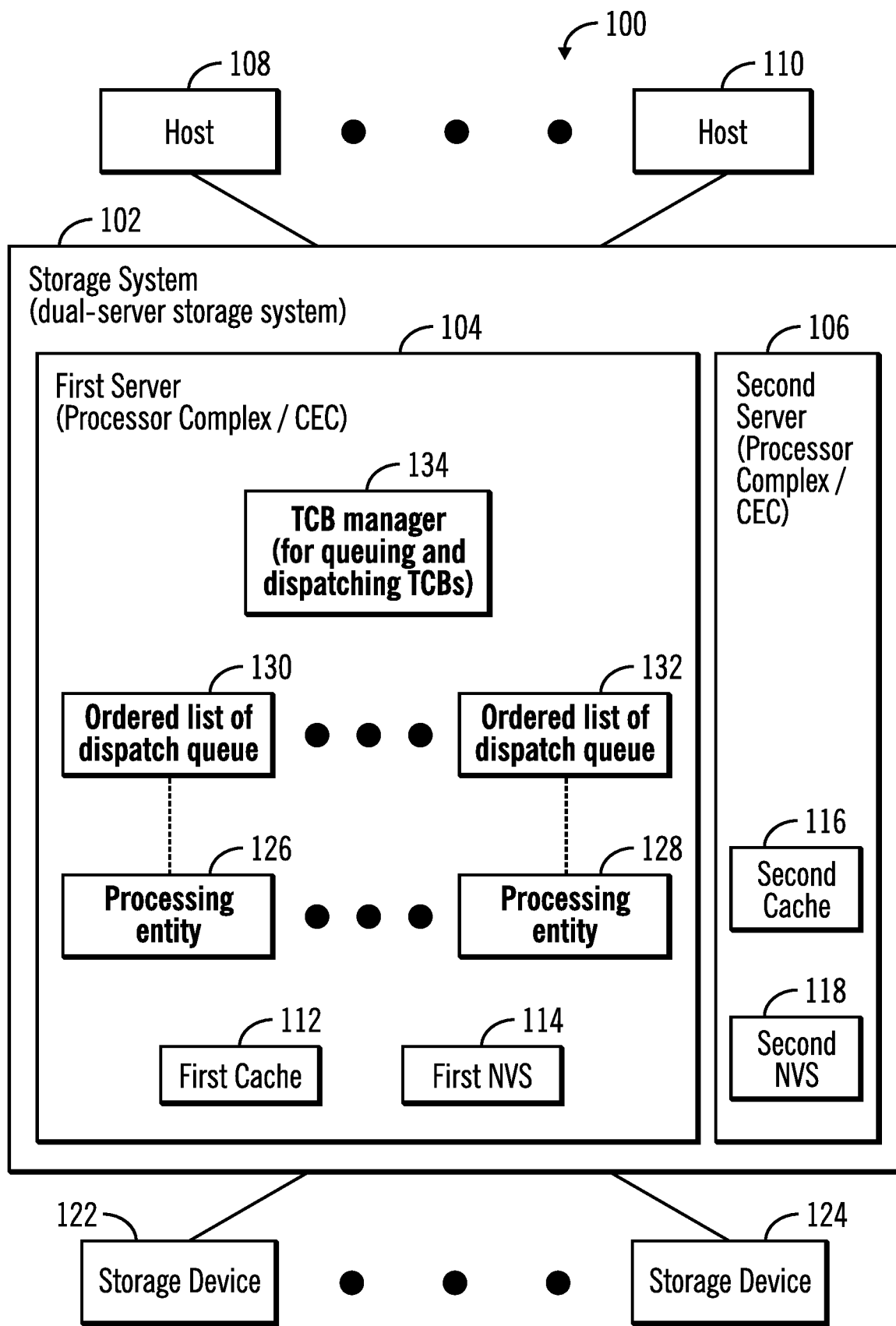
FIG. 1 illustrates a block diagram of a computing environment comprising a storage system comprising a first server and a second server in which a task control block manager is implemented, and where the storage system communicates with a plurality of hosts over a network, in accordance with certain embodiments.

In the following description, reference is made to the accompanying drawings which form a part hereof and which illustrate several embodiments. It is understood that other embodiments may be utilized and structural and operational changes may be made.

Task Queuing and Dispatching Mechanisms

A Central Processing Unit (CPU) complex of a multi-processor based system may be comprised of many processor chips. A processor chip may have multiple cores and each core may execute several threads. If the CPU complex is based on a NUMA architecture, then under the NUMA architecture, a processor (e.g., a CPU) may access its own local memory faster than non-local memory, where non-local memory is memory that is local to another processor or memory that is shared between processors. As a result, memory access time may not be uniform across all of memory so it may be desirable to improve data locality (i.e., have a better cache hit ratio). In addition, cache invalidation to maintain coherency is more expensive across different group of processor chips. Therefore, it may be desirable for a task scheduler to dispatch tasks to different processors via mechanisms that improve data locality and minimize cache invalidation traffic while at the same time the mechanisms make effective use of the processing resources of the plurality of processors when there are many tasks to run.

In certain embodiments, a plurality of ordered lists of dispatch queues corresponding to a plurality of processing entities (e.g., CPUs) are maintained, where each dispatch queue includes one or more task control block (TCB) to perform tasks. The ordered list of dispatch queues for a processing entity (also referred to as a processing unit) provides highest precedence to TCBs in the primary dispatch queue of a processing entity. Additionally, precedence is provided to those dispatch queues that correspond to those processing entities in a same group as the processing entity over those processing entities that are in a different group from the processing entity. In certain embodiments, by defining which dispatch queues a processing entity may look into for locating TCBs to execute, and dispatching a TCB from a dispatch queue when the dispatch queue has more than a threshold value of the number of TCBs, the TCBs that are dispatched are balanced across the processing entities. Furthermore, a TCB that was dispatched earlier is dispatched on the processing entity that processed the TCB last. As a result, data locality is increased and cache invalidation traffic is reduced.

While such mechanisms may attempt to automatically balance the TCBs on the dispatch queues, in many situations different TCBs may take a different amount of time to execute, resulting in different dispatch queues having different workloads even when the TCBs are distributed evenly across the dispatch queues. In certain situations, a dispatch queue may become overloaded with slow tasks (i.e., slowly executing TCBs), resulting in large wait times for TCBs in the dispatch queue. Certain embodiments provide additional mechanisms to balance the number of TCBs in the dispatch queues.

First Balancing Mechanisms for Dispatch Queues

FIG. 1 illustrates a block diagram of a computing environment 100 comprising a storage system 102 comprising a first server 104 and a second server 106, where the storage system 102 communicates with a plurality of hosts 108, 110 over a network, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processing complex or a central electronics complex (CEC) and may include one or more processors and/or processor cores. The storage system 102 may also be referred to as a dual-server storage system.

The storage system 102, the servers 104, 106 and the hosts 108, 110 may be elements in any suitable network, such as, a storage area network, a wide area network, the Internet, an intranet. In certain embodiments, storage system 102, the servers 104, 106 and the hosts 108, 110 may be elements in a cloud computing environment.

The first server 104 includes memory comprising a first cache 112 and a first NVS 114, and the second server 106 includes memory comprising a second cache 116 and a second NVS 118.

In certain embodiments, the cache 112, 116 may comprise a write cache partitioned into one or more ranks, where each rank may include one or more storage tracks. The cache 112, 116 may be any suitable cache known in the art or developed in the future. In some embodiments, the cache 112, 116 may be implemented with a volatile memory and/or non-volatile memory. The cache 112, 116 may store both modified and unmodified data, where the cache 112,116 may periodically destage (i.e., move) data from the cache 112, 116 to one or more storage devices 122, 124 controlled by the servers 104, 106. The NVS 114, 118 may also be referred to as a "persistent" cache and is implemented with non-volatile memory that may or may not utilize external power to retain data stored therein. In some embodiments, a backup power source, such as a battery, supplies the NVS 114, 118 with power to retain the data stored therein in case of power loss. The NVS 114, 118 may store modified data. An application is made aware that an I/O operation is complete once data has successfully been written to cache and the NVS. Data integrity and availability is maintained by retaining two copies of the data until it is hardened to disk, one copy in cache on one server and the second in NVS of the other server. NVS is protected by battery backup. Normal access to the data is from the copy retained in the cache It should be noted that the storage system 102 may be configured and accessed in many different ways. For example, virtualization may be performed to access the hardware elements of the storage system 102. Additionally, in certain embodiments, the storage system 102 may have a single server or more than two servers.

In certain embodiments, each of the servers 104, 106 may have corresponding applications and data structures implemented in each, and the applications and data structures implemented in the first server 104 are shown. The server 106 may have similar applications and data structures, and may have similar hardware, firmware, and/or software.

The first server 104 includes a plurality of processing entities 126, 128, where in certain embodiments each processing entity is a central processing unit (CPU). In certain embodiments, each processing entity 126, 128 is the lowest granularity of a processor that is configurable to execute a task corresponding to a task control block. While only two processing entities are identified by reference numerals 126, 128 in FIG. 1, it is understood that there may be more than two processing entities in the server 104.

Associated with the plurality of processing entities 126, 128 are a plurality of ordered lists of TCB dispatch queues, where the TCB dispatch queues are also referred to as ordered list of dispatch queues 130, 132. A TCB manager 134 is an application implemented in software, firmware, hardware or any combination thereof that executes in the server 104. The TCB manager 134 performs the queuing and dispatching of TCBs and in certain embodiments may be included in or associated with the operating system and/or storage management application that may execute in the server 104.

Figure 2:
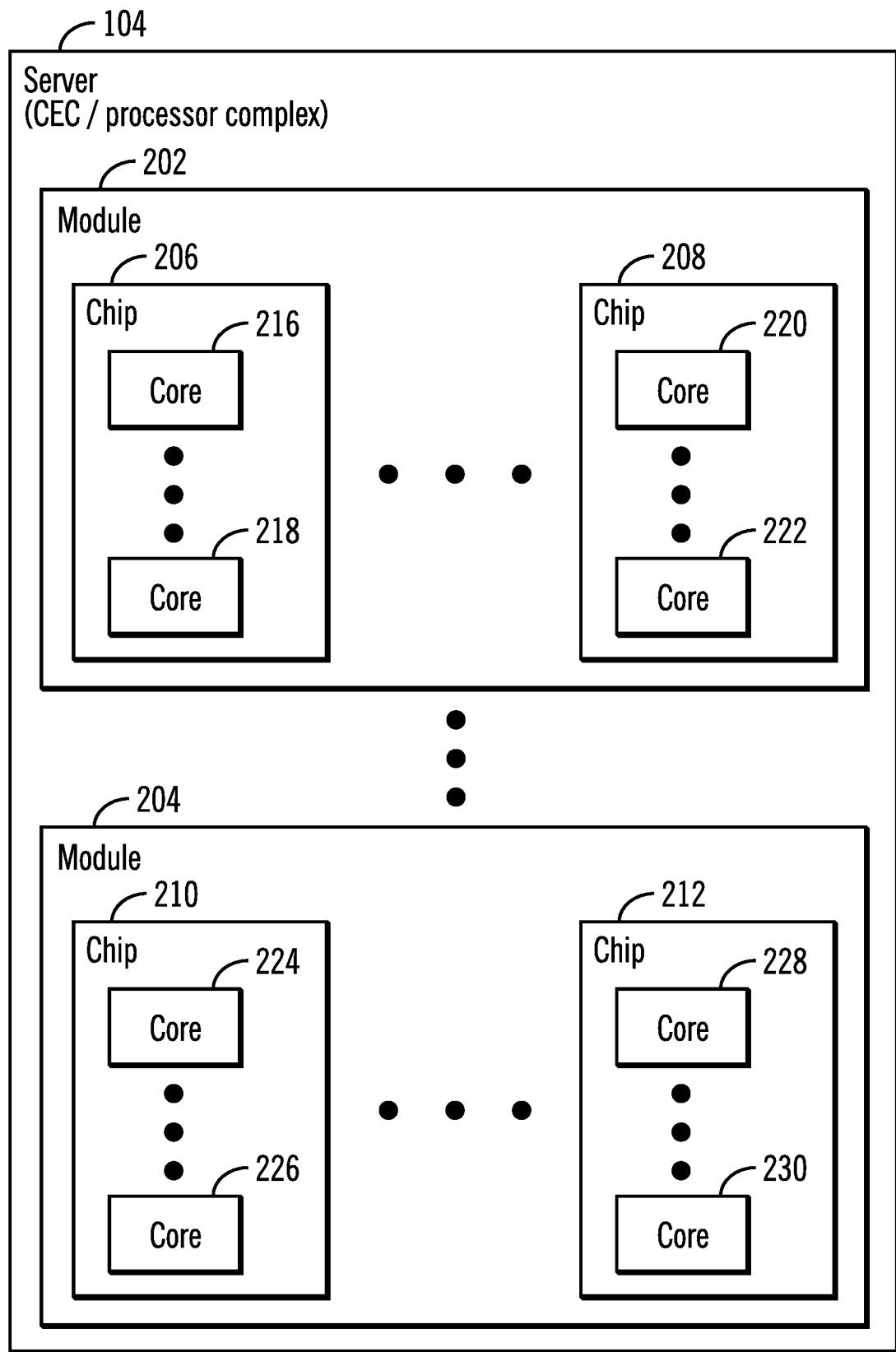
FIG. 2 illustrates a block diagram of a processor complex such as a server or a central electronics complex (CEC), in accordance with certain embodiments.

FIG. 2 illustrates a block diagram of the server 104 that comprises a processor complex or a central electronics complex (CEC), in accordance with certain embodiments. The server 104 may be comprised of a plurality of modules 202, 204 where each module is comprised of a plurality of chips 206, 208, 210, 212, and where each chip is comprised of a plurality of cores 216, 218, 220, 222, 224, 226, 228, 230 as shown in FIG. 2.

Figure 3:
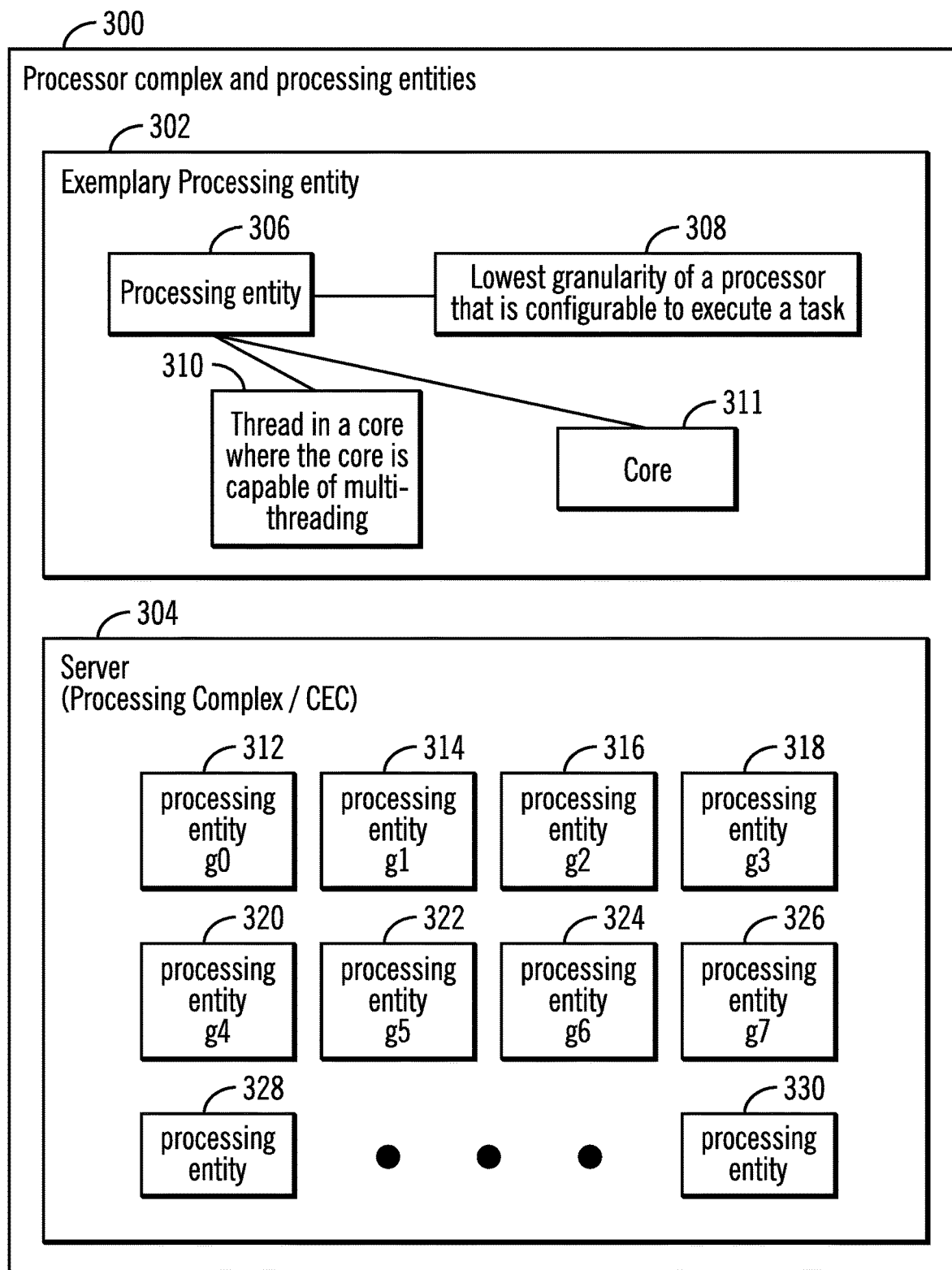
FIG. 3 illustrates a block diagram that shows a processing entity and a processor complex such as a server or a CEC, in accordance with certain embodiments.

FIG. 3 illustrates a block diagram 300 that shows an exemplary processing entity 302 and a server 304 comprising a processor complex or a CEC, in accordance with certain embodiments.

A processing entity 306 may be defined as the lowest granularity of a processor that is configurable to execute a task (as shown via reference numeral 308). The control structures of the task may be found in a TCB. For example, the processing entity 306 may be a thread in a core where the core is capable of multi-threading (as shown via reference numeral 310) or a core 311. In certain embodiments, the processing entity 306 is a CPU.

The server 304 which may correspond to the server 104 shown in FIG. 1 may be comprised of a plurality of processing entities 312, 314, 316, 318, 320, 322, 324, 326, 328, 330 that includes at least eight processing entities g0, g1, g2, g3, g4, g5, g6, g7 that are identified by reference numerals 312, 314, 316, 318, 320, 322, 324, 326 respectively.

Figure 4:
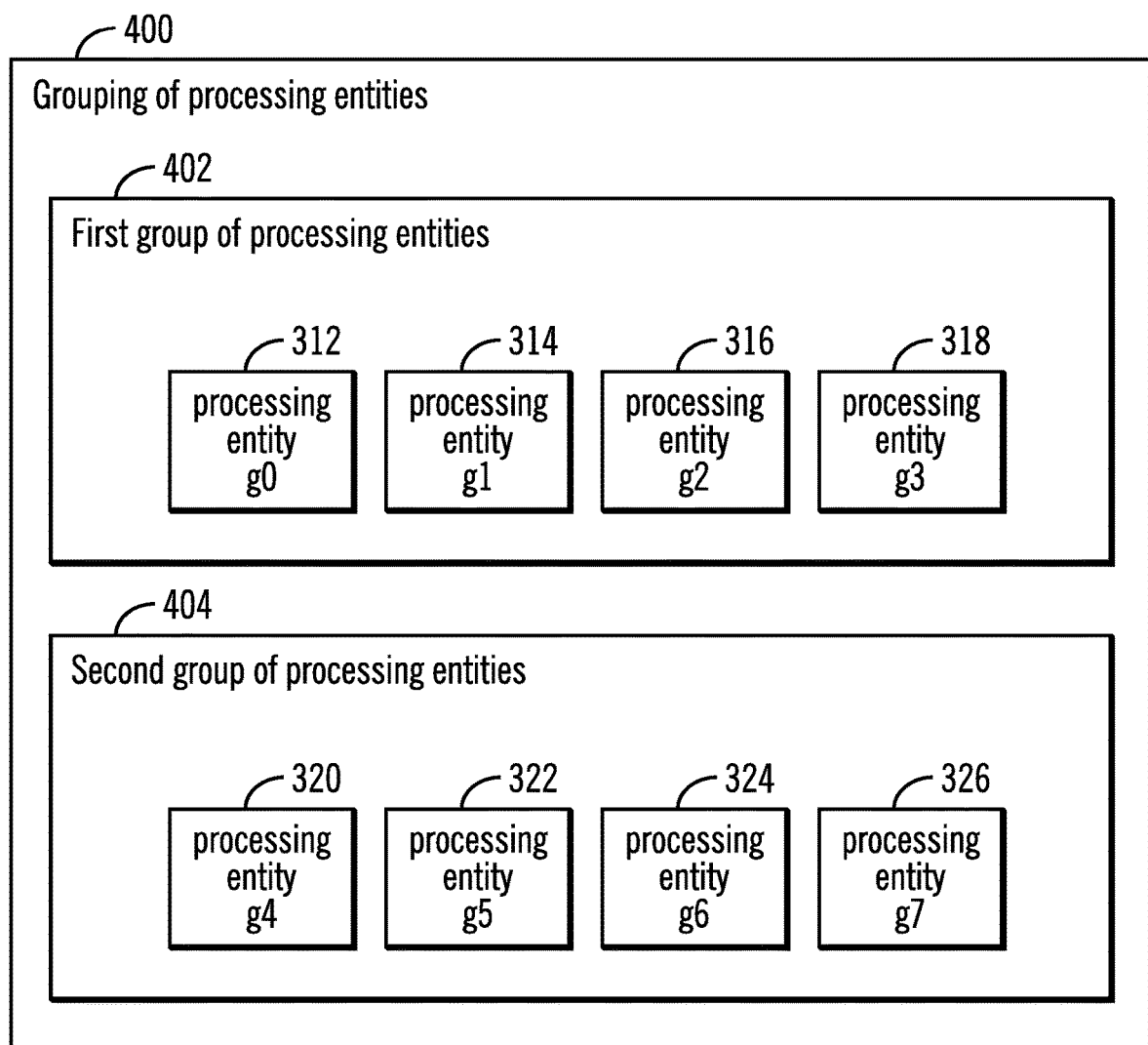
FIG. 4 illustrates a block diagram that shows exemplary groupings of processing entities, in accordance with certain embodiments.

FIG. 4 illustrates a block diagram 400 that shows exemplary groupings of processing entities, in accordance with certain embodiments. The four processing entities g0, g1, g2, g3 (identified via reference numerals 312, 314, 316, 318) of server 104 are included in a first group 402, and the four processing entities g4, g5, g6, g7 (identified by reference numerals 320, 322, 324, 326) are included in a second group 404. In certain embodiments, the first group 402 may comprise processing entities in a first chip 206 and the second group 404 may comprise processing entities in a second chip 208. In other embodiments, the first group 402 may comprise processing entities in a first module 202 and the second group 404 may comprise processing entities in a second module 204. It should be noted that processing entities within the same group are able to perform the execution of tasks of other processing entities in the same group faster, in comparison to tasks of processing entities that are in a different group, because of the sharing of memory by processing entities belonging to the same group.

Figure 5:
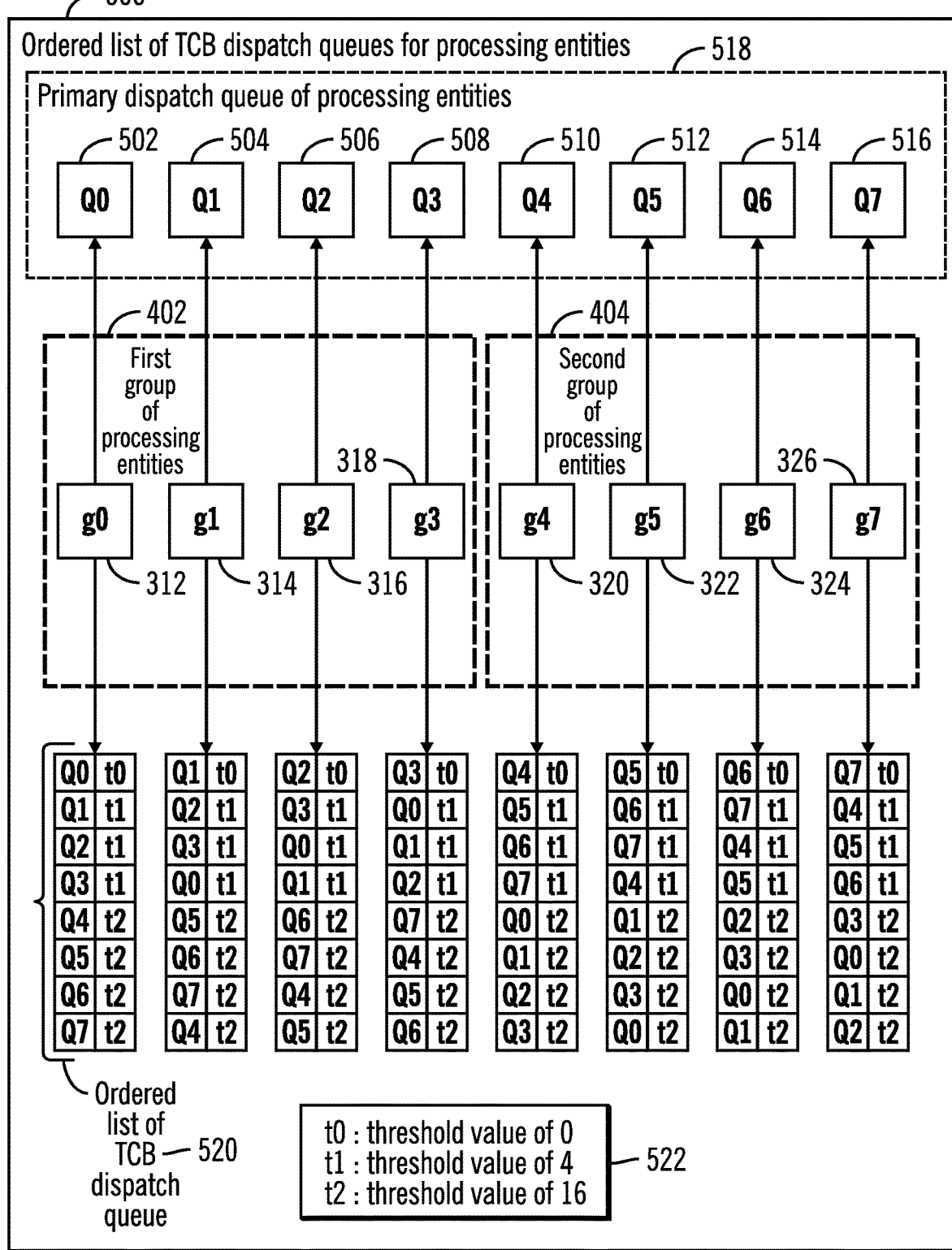
FIG. 5 illustrates a block diagram that shows ordered lists of task control block (TCB) dispatch queues for processing entities, in accordance with certain embodiments.

FIG. 5 illustrates a block diagram 500 that shows ordered lists of task control block (TCB) dispatch queues for processing entities, in accordance with certain embodiments.

FIG. 5 shows a first group 402 of processing entities g0, g1, g2, g3 (reference numerals 312, 314, 316, 318) and a second group 404 of processing entities g4, g5, g6, g7 (reference numerals 320, 322, 324, 326).

Each processing entity has a primary dispatch queue associated with it. For example Q0, Q1, Q2, Q3, Q4, Q5, Q6, Q7 (indicated via reference numerals 502, 504, 506, 508. 510, 512, 514, 516) are primary dispatch queues for processing entities g0, g1, g2, g3, g4, g5, g6, g7 (indicated via reference numerals 312, 314, 316, 318, 320, 322, 324, 326) respectively. Primary dispatch queues Q0, Q1, Q2, Q3, Q4, Q5, Q6, Q7 are collectively referred to via reference numeral 518.

Each processing entity also has an ordered list of dispatch queues, where an exemplary ordered list of dispatch queues for processing entity 312 is shown via reference numeral 520. It may be seen that the ordered list of dispatch queue 520 for the processing entity 312 includes the dispatch queues Q0, Q1, Q2, Q3, Q4, Q5, Q6, Q7 in order with corresponding threshold values t0, t1, t1, t1, t2, t2, t2, t2 respectively. In certain embodiments the threshold values t0, t1, t2 are 0, 4, 16 respectively as shown via reference numeral 522.

For each processing entity in a group, an ordered list of TCB dispatch queues that includes one or more TCB dispatch queues where the processing entity in the group looks for processing work is associated. The processing entity runs a TCB on a dispatch queue only if the dispatch queue has more TCBs than a threshold value. The first dispatch queue assigned to a processing entity has a threshold of 0. This queue is referred to as the processing entity's primary queue.

In FIG. 5 the threshold values (e.g. t0, t1, t2 as shown via reference numeral 522) are defined so that the workload can be balanced when there are many tasks to be run. The threshold values for t1, t2 should not be so small that a task is frequently moved from one group of processing entities to another group of processing entities. The thresholds may also have different values for different hierarchy of processor chips as is often seen in a NUMA based CPU complex.

In the example shown in FIG. 5, there are two groups 402, 404 of processing entities associated with 8 dispatch queues. A processing entity in each group will look into their primary queue first, where the primary queue has threshold t0=0 (reference numeral 522). If there is no work then the processing entity will look in other queues listed in the order in the ordered list of TCB queues (e.g., reference numeral 520).

Figure 6:
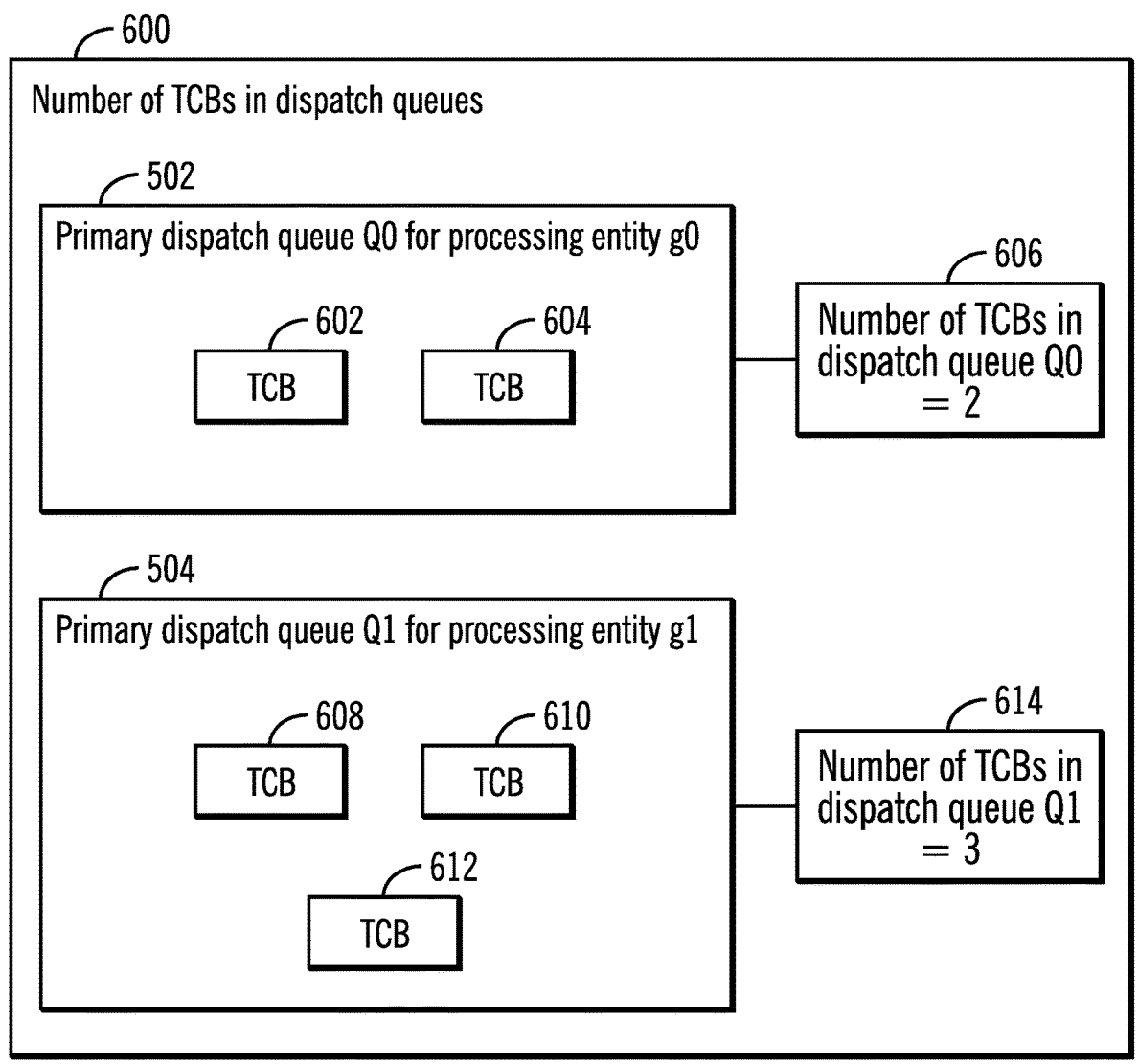
FIG. 6 illustrates a block diagram that shows exemplary number of TCBs in dispatch queues, in accordance with certain embodiments.
Figure 7:
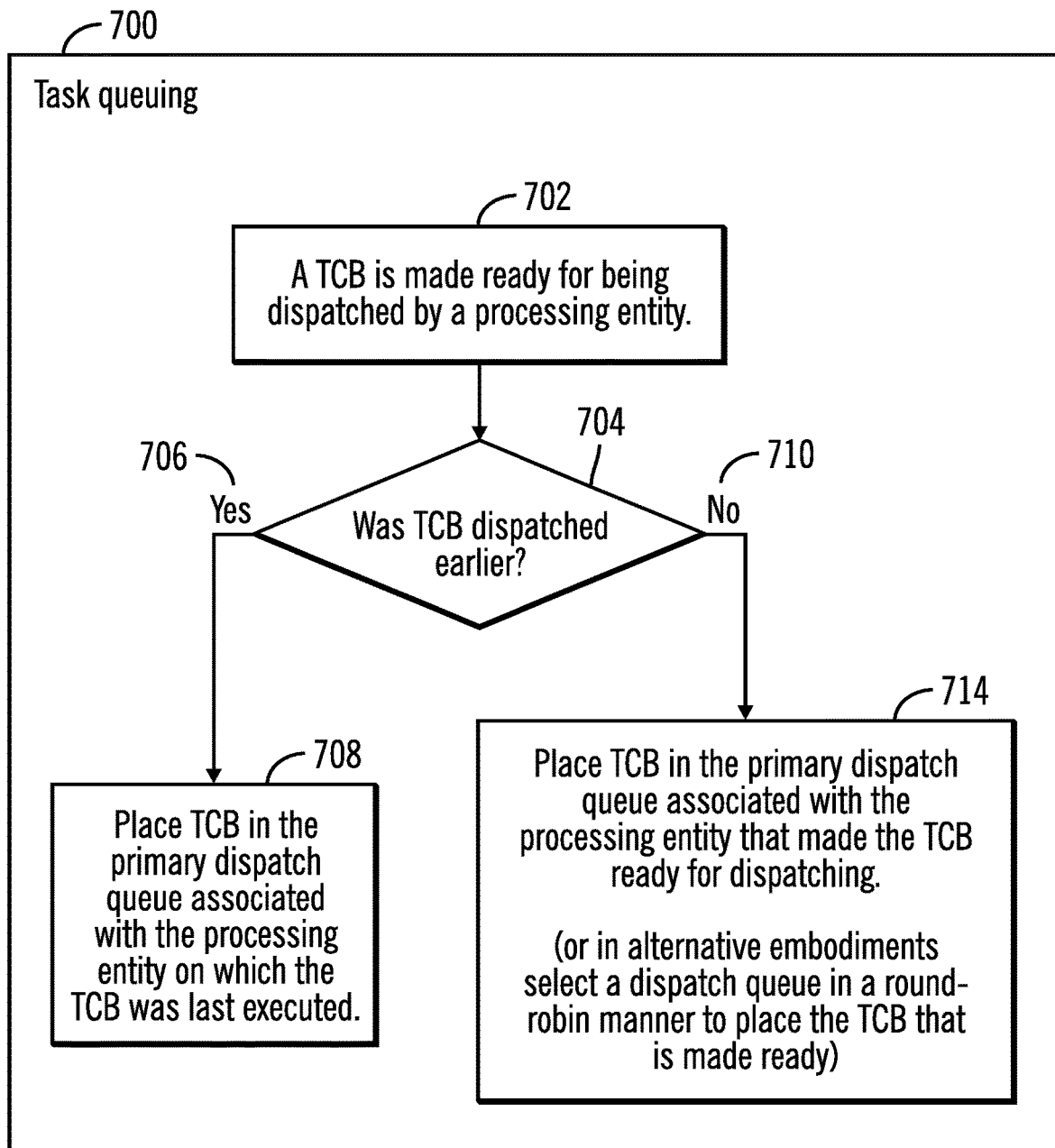
FIG. 7 illustrates a flowchart that shows operations for task queuing, in accordance with certain embodiments.
Figure 8:
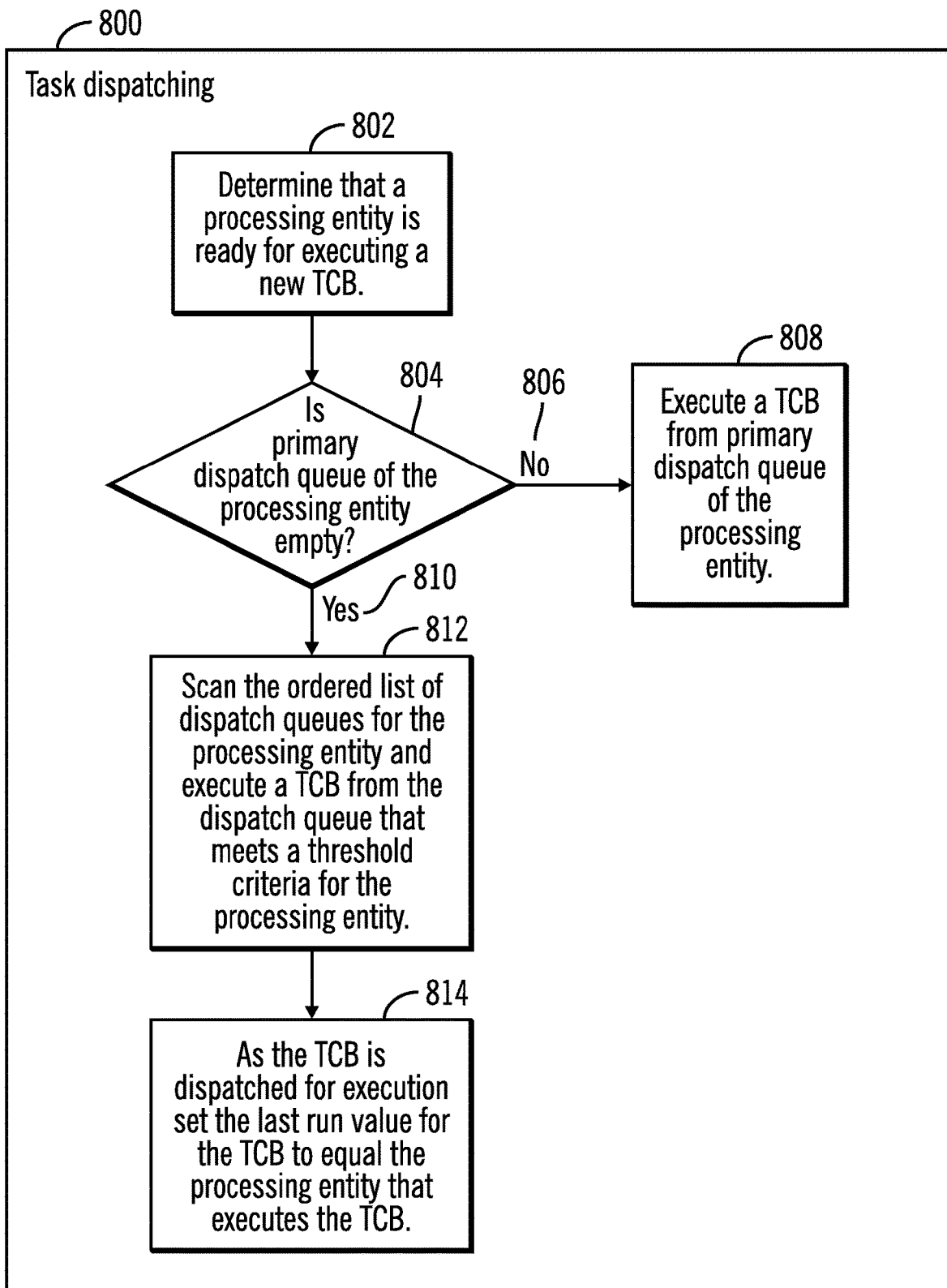
FIG. 8 illustrates a flowchart that shows operations for task dispatching, in accordance with certain embodiments.

FIGS. 6, 7, 8 will illustrate how the data structures in FIG. 5 are populated and used in certain embodiments.

FIG. 6 illustrates a block diagram 600 that shows exemplary number of TCBs in dispatch queues, in accordance with certain embodiments. For example the primary dispatch queue Q0 502 of processing entity g0 312 may include two TCBs 602, 604 and as a result the number of TCBs in dispatch queue Q0 are assigned to be 2 (as shown via reference numeral 606). Similarly the primary dispatch queue Q1 504 of processing entity g1 314 may include three TCBs 608, 610, 612 and as a result the number of TCBs in dispatch queue Q1 are assigned to be 3 (as shown via reference numeral 614).

FIG. 7 illustrates a flowchart 700 that shows operations for task queuing, in accordance with certain embodiments. The operations shown in FIG. 7 may be performed by the TCB manager 134 that executes in the server 104.

Control starts at block 702 in which a TCB is made ready for being dispatched by a processing entity. Control proceeds to block 704, in which a determination is made as to whether the TCB was dispatched earlier 704. If so, ("Yes" branch 706), then the TCB is placed (at block 708) in the primary dispatch queue associated with the processing entity on which the TCB was last executed. As a result, cache invalidation traffic is reduced because the memory/cache for the processing entity may already have data remaining from the last execution of the TCB.

If at block 704 it is determined that the TCB was not dispatched earlier ("No" branch 710) then control proceeds to block 714 in which the TCB is placed in the primary dispatch queue associated with the processing entity that made the TCB ready for dispatching. As a result, the TCB may await execution preferentially in the primary dispatch queue of the processing entity that made the TCB ready for dispatching. Since the TCB has not been executed before, such a placement of the TCB may still be efficient as the data saved in memory/cache for making the TCB ready for dispatching may be used for executing the TCB later on. In alternative embodiments, in block 714, a dispatch queue is selected in a round-robin manner to place the TCB that is made ready.

FIG. 8 illustrates a flowchart 800 that shows operations for task dispatching by scanning the ordered list of dispatch queues (e.g., 520), in accordance with certain embodiments. The operations shown in FIG. 8 may be performed by the TCB manager 134 that executes in the server 104.

Control starts at block 802 in which it is determined that a processing entity (e.g., processing entity g0 312) is ready for executing a new TCB.

Control proceeds to block 804 in which a determination is made as to whether the primary dispatch queue in the ordered list of dispatch queues of the processing entity is empty. If not ("No" branch 806), then a TCB from the primary dispatch queue of the processing entity is dispatched and executed (at block 808). For example, in FIG. 5 which sets the threshold value of t0 to be 0 for primary dispatch queue Q0 (as shown via reference numerals 520, 522) as long as there is at least 1 or more TCBs in the primary dispatch queue Q0 a TCB is dispatched and executed from the dispatch queue Q0.

If at block 804 it is determined that the primary dispatch queue of the processing entity is not empty ("Yes" branch 810) then control proceeds to block 812 in which the ordered list of dispatch queues are scanned for the processing entity and a TCB is executed from the dispatch queue that meets a threshold criteria for the processing entity. For example, in FIG. 5, if there are no TCBs in the primary dispatch queue Q0 (as shown via reference numerals 520, and 522 which shows t0 to be 0), then the dispatch queue Q1 which has a threshold t1 of 4 (as shown via reference numeral 520, 522) is examined. Thus if the dispatch queue Q1 has more than 4 TCBs then a TCB from dispatch queue Q1 is taken for dispatch and execution. In such a manner, the entire list of dispatch queues in the ordered list of dispatch queues for the processing element is scanned and as soon as any dispatch queue has a number of TCBs that exceeds the threshold (indicated via t0, t1, t2 in reference numeral 520, 522) a TCB is taken for dispatch and execution from that dispatch queue. It should be noted in the ordered list of TCB dispatch queue, the preference is highest for the primary dispatch queue, then dispatch queues of processing elements in the same group, and then dispatch queues of processing elements in other groups. For example, FIG. 5 reference numeral 520 shows that after emptying the primary dispatch queue Q0, dispatch queues Q1, Q2, Q3 that are dispatch queues of the first group of processing entities 402 to which the processing entity g0 belongs are processed, and if the number of TCBs in these dispatch queues Q1, Q2, Q3 exceed the low threshold of 4, TCBs are taken out for processing from these dispatch queues Q1, Q2, Q3. Only when none of the dispatch queues Q1, Q2, Q3 have more than 4 waiting TCBs (as t1 is 4) are the dispatch queues Q4, Q5, Q6, Q7 of the second group 404 of processing entities examined. For the dispatch queues Q4, Q5, Q6, Q7 of the second group 404 of processing entities the threshold t2 is set to be considerably higher than t1 and is set to 16. Hence, only if there are more than 16 TCBs waiting in dispatch queues of the second group are such TCBs eligible for dispatch to and processing by the processing entity g0. As the TCBs are dispatched for execution, the lastrun value for a TCB is set to equal the processing entity that executes the TCB (at block 614), where the lastrun value for the TCB stores the identity of the processing entity that has last executed the TCB.

In FIGS. 5-8 the threshold t1 should be a small value but large enough so TCBs do not move between queues when there is a small amount of work in the system. For example, a value of 4 or 8 may be an appropriate value for t1. The more hierarchies of processing entity groups that are there, the higher the threshold value should be, i.e., t2 should be much bigger than t1 and if in certain embodiments there is a threshold t3, then t3 should be much greater than t2.

Figure 9:
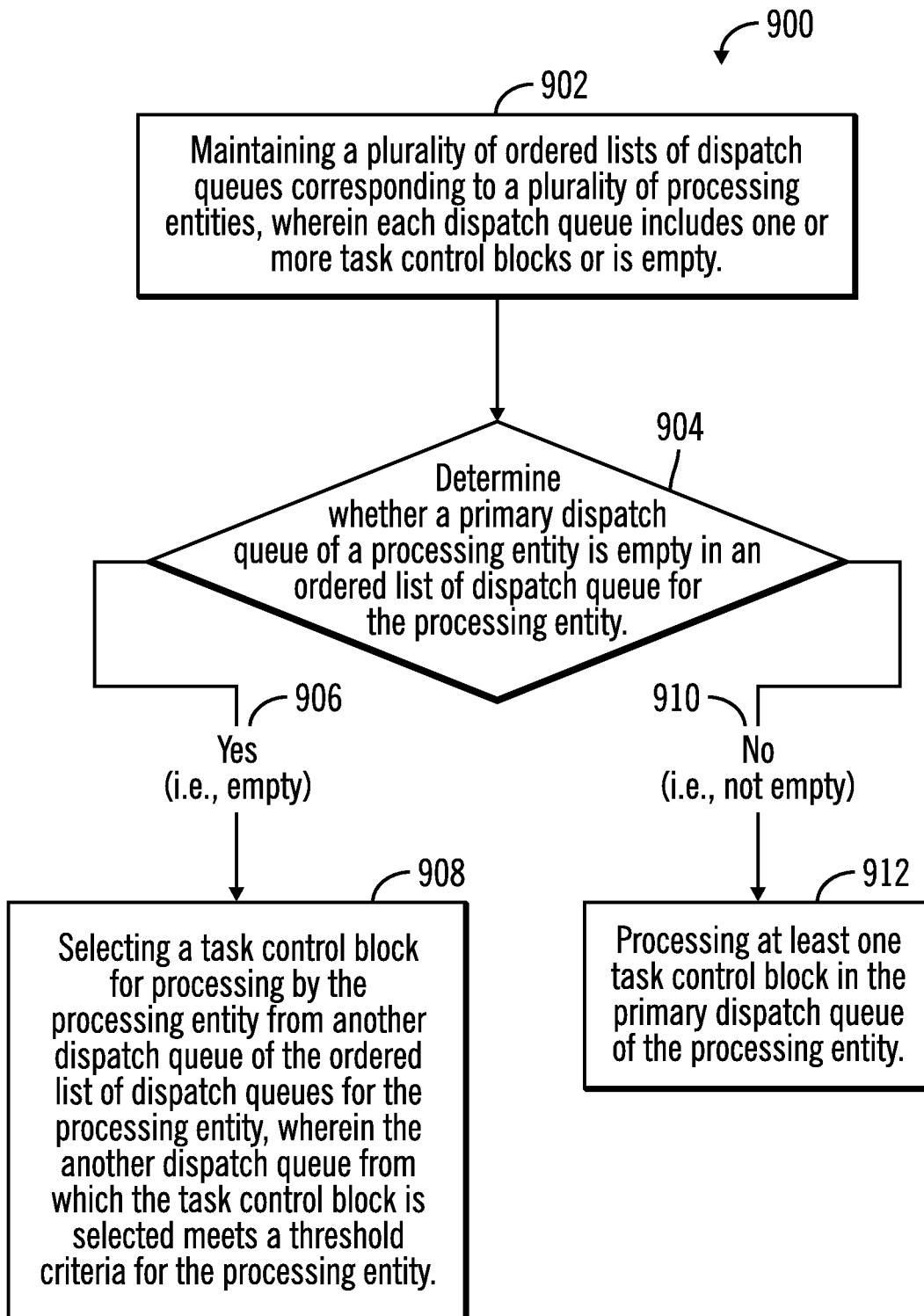
FIG. 9 illustrates a flowchart that shows operations for task dispatching from ordered lists of dispatch queues, in accordance with certain embodiments.

FIG. 9 illustrates a flowchart 900 that shows operations for task dispatching from ordered lists of dispatch queues, in accordance with certain embodiments. The operations shown in FIG. 9 may be performed by the TCB manager 134 that executes in the server 104.

Control starts at block 902 in which a plurality of ordered lists of dispatch queues corresponding to a plurality of processing entities are maintained, wherein each dispatch queue includes one or more task control blocks or is empty (i.e., each dispatch queue is either empty or includes one or more task control blocks). A determination is made (at block 904) as to whether a primary dispatch queue of a processing entity is empty in an ordered list of dispatch queue for the processing entity. In response to determining that the primary dispatch queue of the processing entity is empty ("Yes" branch 906) control proceeds to block 908 in which a task control block is selected for processing by the processing entity from another dispatch queue of the ordered list of dispatch queues for the processing entity, wherein the another dispatch queue from which the task control block is selected meets a threshold criteria for the processing entity. As a result, tasks are dispatched to improve data locality and reduce cache invalidation traffic. Additionally, many processing entities are used when there are many tasks to be executed. Furthermore, processing entities are utilized in a balanced manner for executing tasks.

In response to determining that the primary dispatch queue of the processing entity is not empty ("No" branch 910) control proceeds to block 912 in which at least one task control block in the primary dispatch queue of the processing entity is processed. As a result, task control blocks on the primary dispatch queue of the processing entity have precedence for execution over task control blocks on other dispatch queues of the processing entity.

Therefore FIGS. 1-9 illustrate certain embodiments in which TCBs dispatches are balanced across CPUs, and re-dispatches are on the same group of CPUs to maximize data locality and minimize cache invalidation traffic.

Second Balancing Mechanisms For Dispatch Queues

FIGS. 1-9 have described various embodiments for dispatching TCBs on dispatch queues where ordered lists of dispatch queues are maintained for each processing entity. While the embodiments described in FIGS. 1-9 provide mechanisms to balance the number of TCBs on dispatch queues, there are situations in which the workloads on the dispatch queues are not in balance. For example, a dispatch queue may become overloaded with slow tasks (e.g., TCBs in the dispatch queue take a greater amount of time to execute in comparison to TCBs on other dispatch queues). As a result, the wait time for executing a TCB from the overloaded dispatch queue may become significant and may impact the performance of the system.

Certain embodiments provide additional mechanisms for distributing TCB among dispatch queues during heavy workloads on dispatch queues, wherein during heavy workloads one dispatch queue may become overloaded in comparison to the other dispatch queues, but the other dispatch queues are sufficiently busy so as not to assist with execution of TCBs waiting for execution in the overloaded dispatch queue. The additional mechanisms provided by such embodiments maintain the advantages of TCB allocation described in FIGS. 1-9 in which tasks are kept in ordered lists of dispatch queues and take advantage of cache locality, while at the same time allow for a dispatch queue to adapt when the dispatch queue becomes overly busy.

Figure 10:
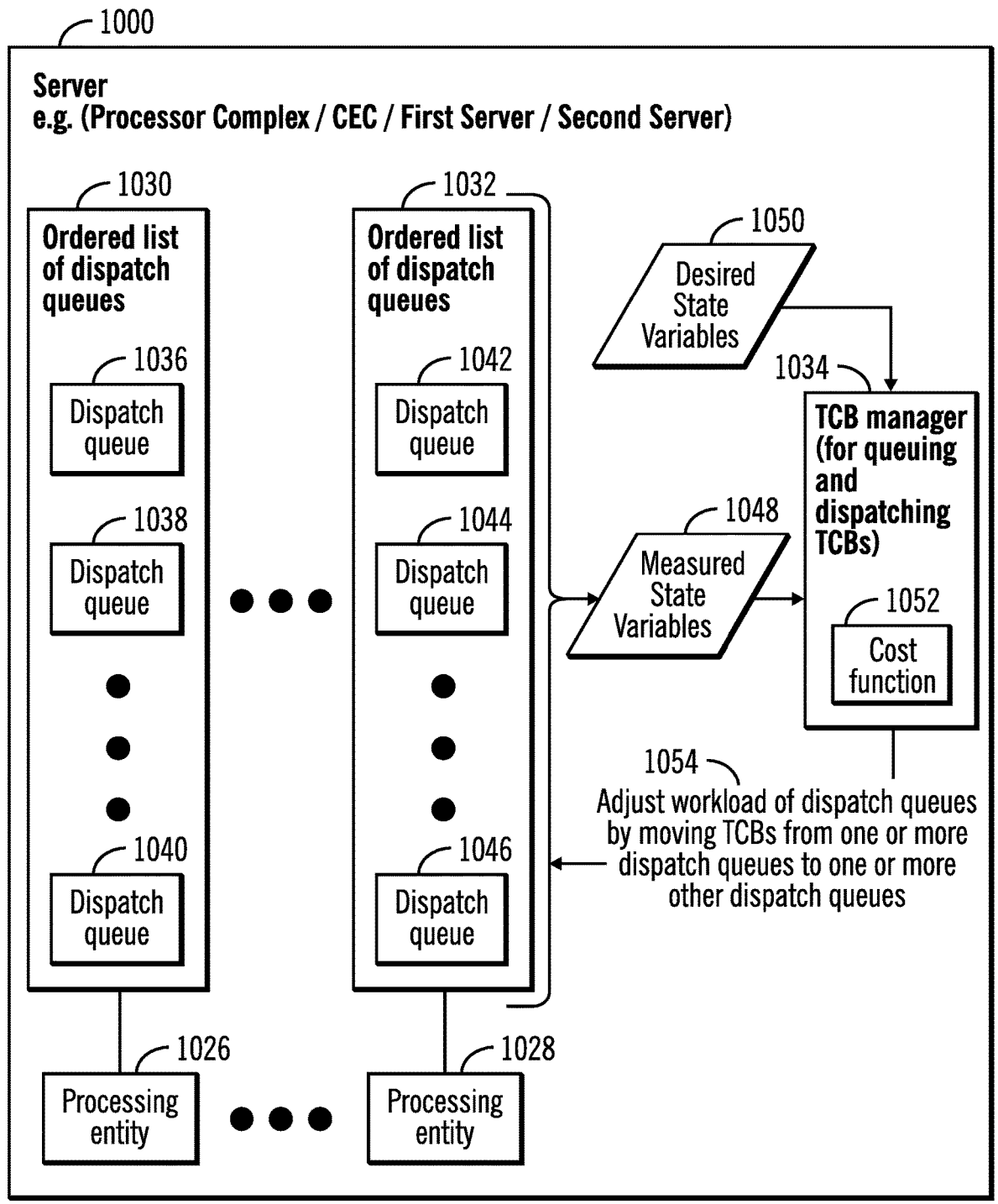
FIG. 10 illustrates a block diagram of a server in which workloads of dispatch queues in ordered lists of dispatch queues are balanced by moving TCBs among the dispatch queues, based on determining the state of the dispatch queues, in accordance with certain embodiments.

FIG. 10 illustrates a block diagram of a server 1000 in which workloads of dispatch queues in ordered lists of dispatch queues are balanced by moving TCBs among the dispatch queues, based on determining the state of the dispatch queues, in accordance with certain embodiments. The server 1000 may be either the first server 104 or the second server 106 and may be included in the storage system 102 that is coupled to the one or more hosts 108, 110 and the storage devices 122, 124.

The server 1000 includes a plurality of processing entities 1026, 1028, where in certain embodiments each processing entity is a central processing unit (CPU). In certain embodiments, each processing entity 1026, 1028 is the lowest granularity of a processor that is configurable to execute a task corresponding to a task control block. While only two processing entities are identified by reference numerals 1026, 1028 in FIG. 10, it is understood that there may be more than two processing entities in the server 1000.

Associated with the plurality of processing entities 1026, 1028 are a plurality of ordered lists 1030, 1032 of TCB dispatch queues, where the ordered list of TCB dispatch queues are also referred to as ordered list of dispatch queues. The ordered list 1030 includes a plurality of dispatch queues 1036, 1038, 1040, and the ordered list 1032 includes a plurality of dispatch queues 1042, 1044, 1046. The ordered lists of dispatch queues (shown via reference numerals 1030, 1032) may also be associated with processing entities 1026, 1028 in accordance with embodiments shown in FIGS. 1-9.

A TCB manager 1034 is an application implemented in software, firmware, hardware or any combination thereof that executes in the server 1000. The TCB manager 1034 performs the queuing and dispatching of TCBs and in certain embodiments may be included in or associated with the operating system and/or storage management application that may execute in the server 1000.

Each of the dispatch queues 1036, 1038, 1040, 1042, 1044, 1046 may have one or more tasks represented by TCBs queued in the dispatch queues 1036, 1038, 1040, 1042, 1044, 1046 for execution by the processing units 1026, 1028. The TCB manager 1034 may dispatch the TCBs to the dispatch queues 1036, 1038, 1040, 1042, 1044, 1046, and some dispatch queues may have no TCB waiting for execution.

In certain embodiments, the TCB manager 1034 determines the state of each of the dispatch queues 1036, 1038, 1040, 1042, 1044, 1046 by retrieving or determining the value of state variables of each of the dispatch queues 1036, 1038, 1040, 1042, 1044, 1046. The retrieved or determined value of state variables of each of the dispatch queues 1036, 1038, 1040, 1042, 1044, 1046 are referred to as measured state variables 1048. The measured state variables 1048 may include measurements for many different types of variables, including a variable that indicates values of average wait time for TCBs being executed in a dispatch queue. For example, the measured average wait time for TCBs being executed from the dispatch queue 1036 may be 300 milliseconds.

Desired state variables 1050 that indicate the desired values of the measured state variables 1048 for balancing the workloads on the dispatch queues 1036, 1038, 1040, 1042, 1044, 1046 may be provided by a user or administrator or may be determined by using historical performance statistics generated by an application. For example, a desired state variable may indicate that the desired value for the average wait time for a TCB in any of dispatch queues 1036, 1038, 1040, 1042, 1044, 1046 should be less than 100 milliseconds.

In certain embodiments, the TCB manager 1034 attempts to optimize a cost function 1052, where the cost function 1052 is reflective of the difference between the desired state variables 1050 and the measured state variables 1048. For example, if a desired state variable 1050 indicates that the desired value for the average wait time for a TCB in any of dispatch queues 1036, 1038, 1040, 1042, 1044, 1046 should be less than 100 milliseconds and the measured state variable 1048 indicates the average wait time for TCBs being executed from the dispatch queue 1036 is 300 milliseconds, then the 200 millisecond difference from the desired value as calculated by the cost function 1052 needs to be reduced by potentially shifting TCBs from the dispatch queue 1036 to other dispatch queues.

Therefore, the TCB manager 1034 attempts to adjust the workload of the dispatch queues 1036, 1038, 1040, 1042, 1044, 1046 moving TCBs from one or more dispatch queues to one or more other dispatch queues (as shown via reference numeral 1054).

The ordered list of dispatch queues 1030, 1032 may also be associated with processing entities 1026, 1028 in accordance with embodiments shown in FIGS. 1-9.

Figure 11:
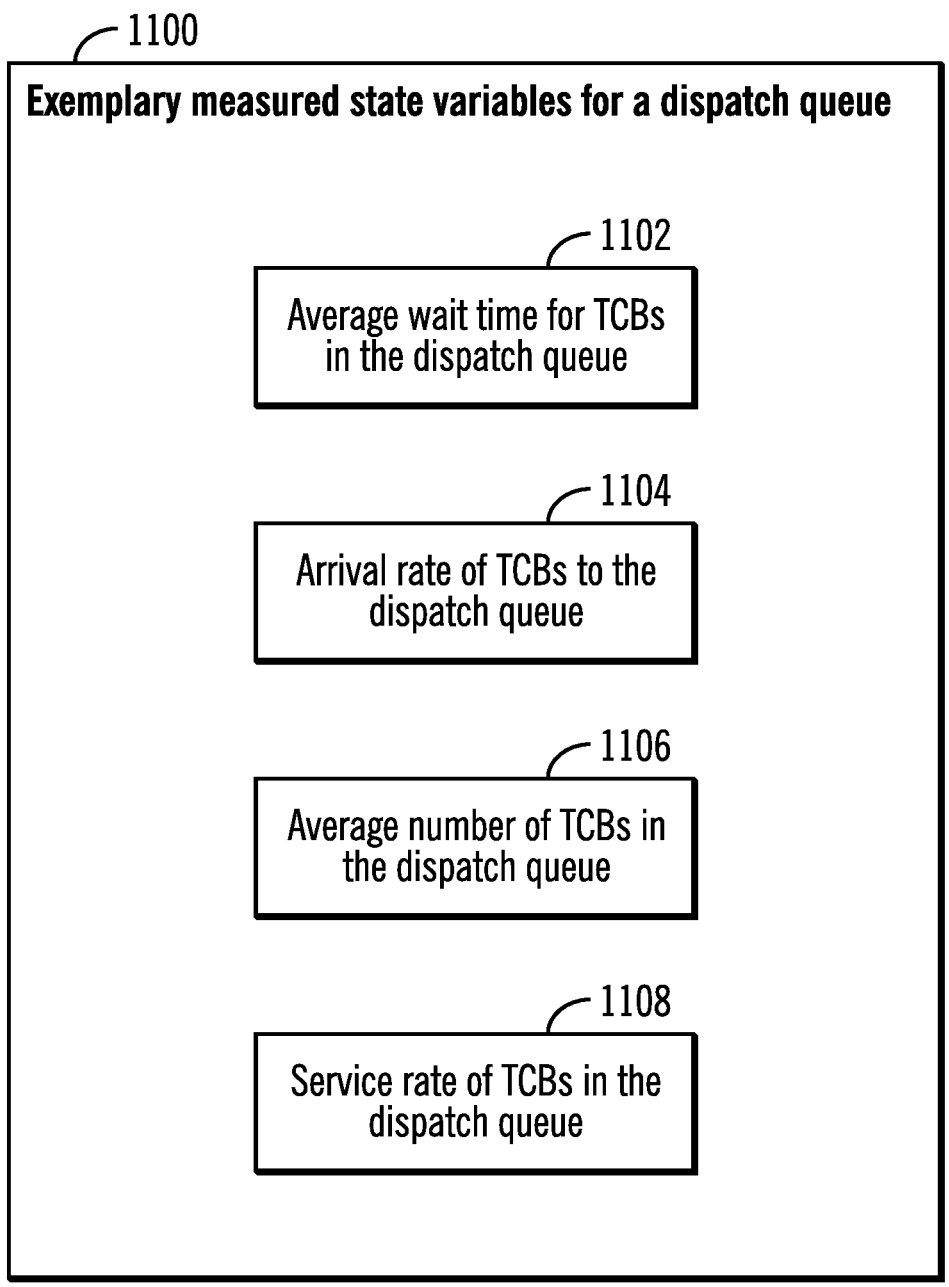
FIG. 11 illustrates a block diagram that shows exemplary measured state variables for a dispatch queue, in accordance with certain embodiments.

FIG. 11 illustrates a block diagram 1100 that shows exemplary measured state variables 1048 for a dispatch queue, in accordance with certain embodiments.

The exemplary measured state variables 1048 may include a variable 1102 that indicates the average wait time for TCBs in the dispatch queue, a variable 1104 that represents the arrival rate of TCBs to the dispatch queue (e.g., 5 TCBs arriving per second), a variable 1106 that represents the average number of TCBs in a dispatch queue, and a variable 1108 that represents the service rate (i.e., the rate at which TCBs are processed, e.g., 5 TCBs/second) of TCBs in the dispatch queue. Other measured variables besides the ones shown in FIG. 11 may be used in additional embodiments. The desired value for the measured state variables 1102, 1104, 1106, 1108 may be provided by a user, an administrator or an automated program.

Figure 12:
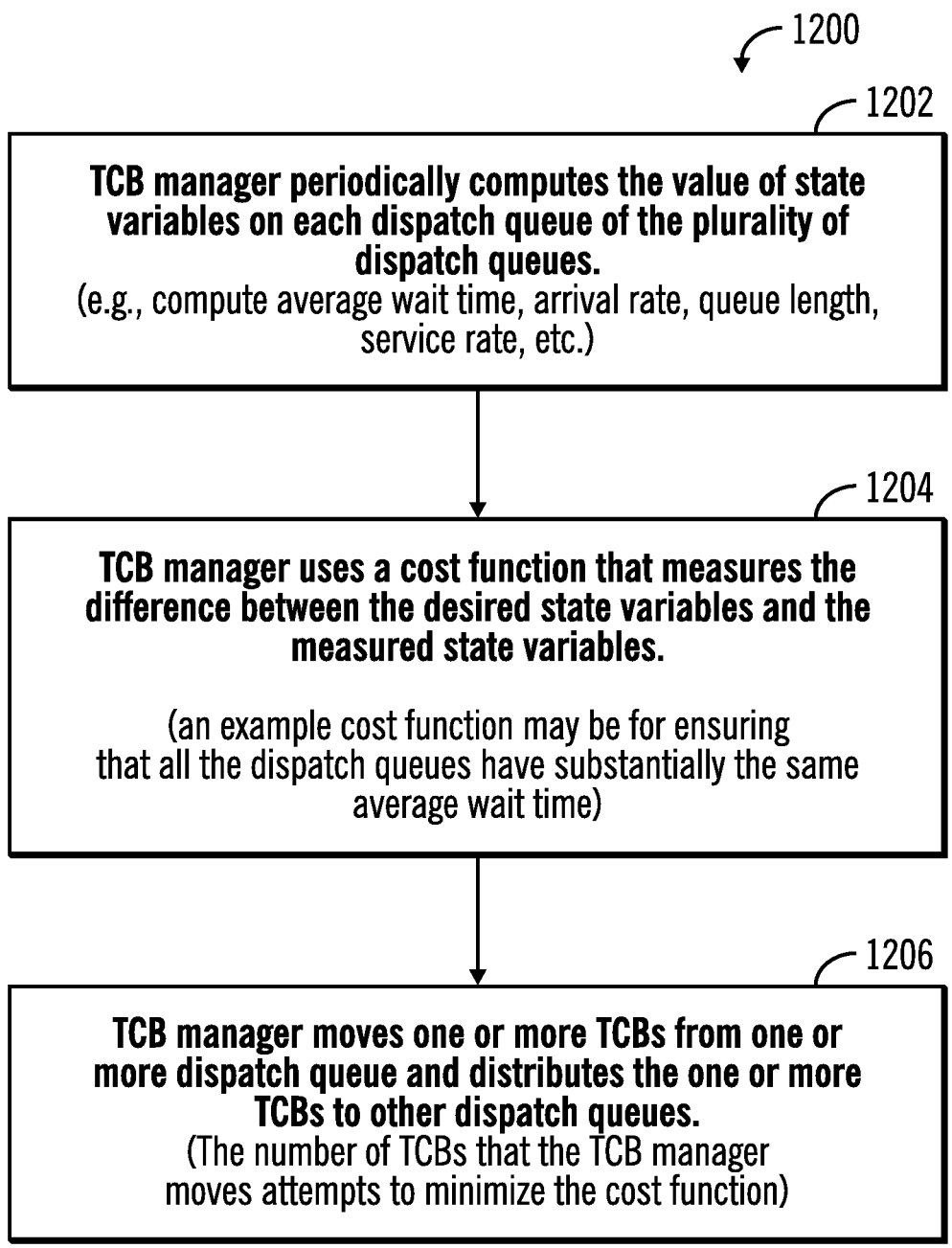
FIG. 12 illustrates a flowchart that show conditions under which TCBs are moved from one dispatch queue to another dispatch queue, in accordance with certain embodiments.

FIG. 12 illustrates a flowchart 1200 that show conditions under which TCBs are moved from one dispatch queue to another, in accordance with certain embodiments. The operations shown in FIG. 12 may be performed by the TCB manager 1034 that executes in the server 1000.

Control starts at block 1202 in which the TCB manager 1034 periodically (e.g., every 50 milliseconds) computes the value of the state variables on each dispatch queue of the plurality of dispatch queues 1036, 1038, 1040, 1042, 1044, 1046 to determine the measured state variables 1048. For example, the TCB manager 1034 may compute the average wait time for TCBs in the dispatch queue 1102, the arrival rate of TCBs to the dispatch queue 1104, the average number of TCBs in the dispatch queue (also referred to as "average queue length") 1106, the service rate of TCBs in the dispatch queue 1108, etc.

From block 1202 control proceeds to block 1204 in which the TCB manager 1034 uses a cost function 1052 that measures the difference between the desired state variables 1050 and the measured state variables 1048. For example, an exemplary cost function may be for ensuring that each of the dispatch queues have substantially the same average wait time (e.g., between 100-150 milliseconds) for TCBs.

From block 1204 control proceeds to block 1206 in which the TCB manager 1034 removes one or more TCBs from one or more dispatch queues and distributes the one or more TCBs to other dispatch queues. The number of TCBs that the TCB manager removes attempts to minimize the cost function 1052. Thus TCBs are removed from relative overloaded dispatch queues and distributed among other dispatch queues.

Figure 13:
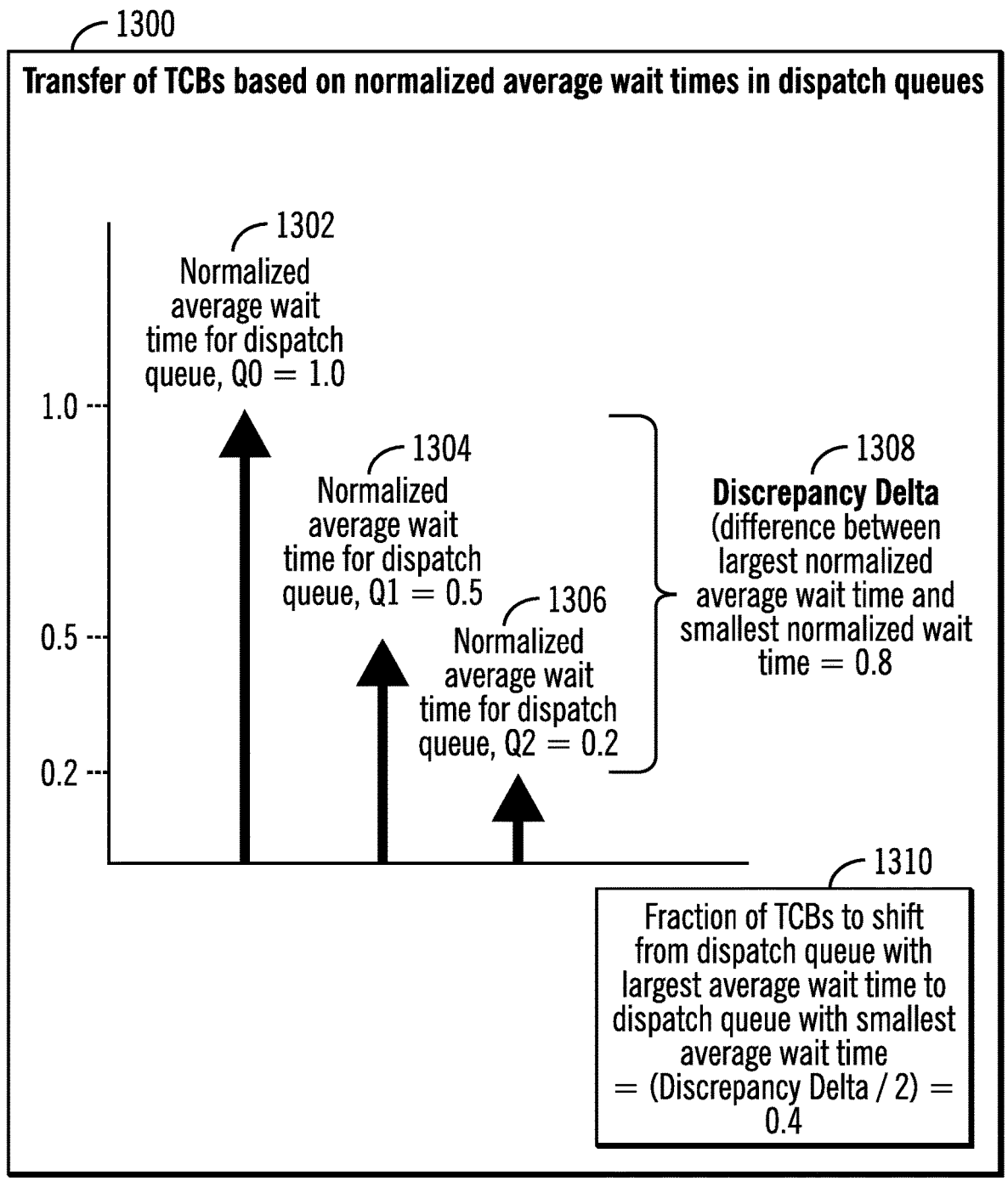
FIG. 13 illustrates a block diagram that shows the transfer of TCBs based on normalized average wait times in dispatch queues, in accordance with certain embodiments.

FIG. 13 illustrates a block diagram 1300 that shows the transfer of TCBs based on normalized average wait times in dispatch queues, in accordance with certain embodiments. The operations shown in FIG. 13 may be performed by the TCB manager 1034 that executes in the server 1000.

The TCB manager 1034 periodically (e.g., every 50 milliseconds) determines the average wait time for TCBs for each of three dispatch queues, Q0, Q1, Q2. For example, it may be determined that in the previous 50 milliseconds, TCB A waited for 10 milliseconds in dispatch queue Q0 for execution and TCB B waited for 20 milliseconds in dispatch queue Q0 for execution, and therefore the average wait time for TCBs in dispatch queue Q0 is computed to be 15 milliseconds.

The average wait times of the dispatch queues are normalized between 0 and 1, where 1 represents the maximum average wait time for a dispatch queue. For example if the average wait times for dispatch queues Q0, Q1, and Q2 are 15 milliseconds, 7.5 milliseconds, and 3 milliseconds respectively, then the normalized average wait times for the dispatch queues Q0, Q1, and Q2 are 1.0, 0.5, and 0.2 as shown via reference numerals 1302, 1304, 1306, because the wait times are normalized by dividing by the maximum wait time of 15 milliseconds, providing each wait time a value from 0 to 1.

The TCB manager 1034 calculates a discrepancy delta 1308 that indicates the difference between the largest normalized wait time (1.0 for dispatch queue Q0) and the smallest normalized wait time (0.2 for dispatch queue Q2). In FIG. 13 the discrepancy delta 1308 is calculated to be 0.8 which is the difference between the normalized average wait time for dispatch queue Q0 and the normalized average wait time for dispatch queue Q2. The discrepancy delta 1308 corresponds to the cost function 1052 that needs to be minimized. If the discrepancy delta is greater than a predetermined threshold (e.g. a threshold of 0.5) then the TCB manager 1034 determines the fraction of TCBs to shift from the dispatch queue with largest average wait time (dispatch queue, Q0) to the dispatch queue with smallest average wait time (dispatch queue, Q2). The fraction of TCBs to shift equals the discrepancy delta 1308 divided by 2, which is 0.4 (as shown via reference numeral 1310). Therefore, 0.4 (i.e., 4/10 or 40%) of the TCBs of dispatch queue Q0 are to be moved to dispatch queue Q2 in an attempt to equalize the number of TCBs in dispatch queue Q0 and dispatch queue Q2. In alternative embodiments, the discrepancy delta 1308 may be calculated as the difference between the largest normalized wait time and the second largest normalized wait time, and TCBs may be moved accordingly if the discrepancy delta is greater than a threshold.

Figure 14:
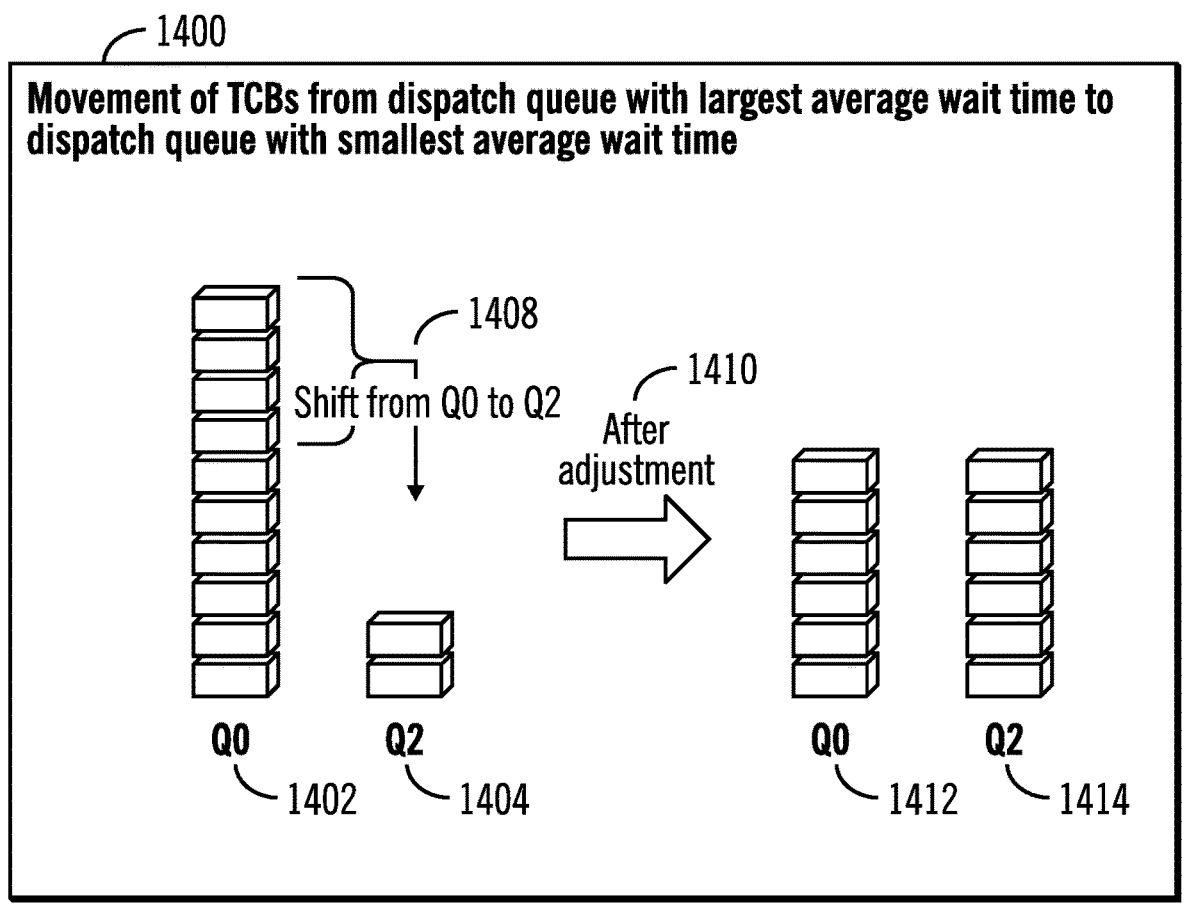
FIG. 14 illustrates a block diagram that shows the movement of TCBs from a dispatch queue with the largest average wait time for TCBs to a dispatch queue with the smallest average wait time for TCBs, in accordance with certain embodiments.

FIG. 14 illustrates a block diagram that shows the movement of TCBs from a dispatch queue with the largest average wait time to a dispatch queue with the smallest average wait time, in accordance with certain embodiments. The operations shown in FIG. 14 may be performed by the TCB manager 1034 that executes in the server 1000.

Initially, queue Q0 has 10 TCBs (shown via reference numeral 1402), and queue Q2 has 2 TCBs (shown via reference numeral 1404). As result of the operations shown in FIG. 13, 40% of the TCBs of queue Q0 are moved to queue Q2 (shown via reference numeral 1408 in which 4 out of the 10 TCBs are moved from dispatch queue Q0 to dispatch queue Q2). The TCBs in queues Q0 and Q1 are shown after the movement via reference numerals 1412, 1414. Therefore, the TCBs are balanced in the dispatch queues Q0 and Q1.

It should be noted that the operations described in FIGS. 10-14 are performed concurrently with the operations described in FIGS. 1-9. As a results, in addition to the rebalancing of queues attempted by operations shown in FIGS. 1-9, rebalancing is also attempted via operations described in FIGS. 10-14.

Figure 15:
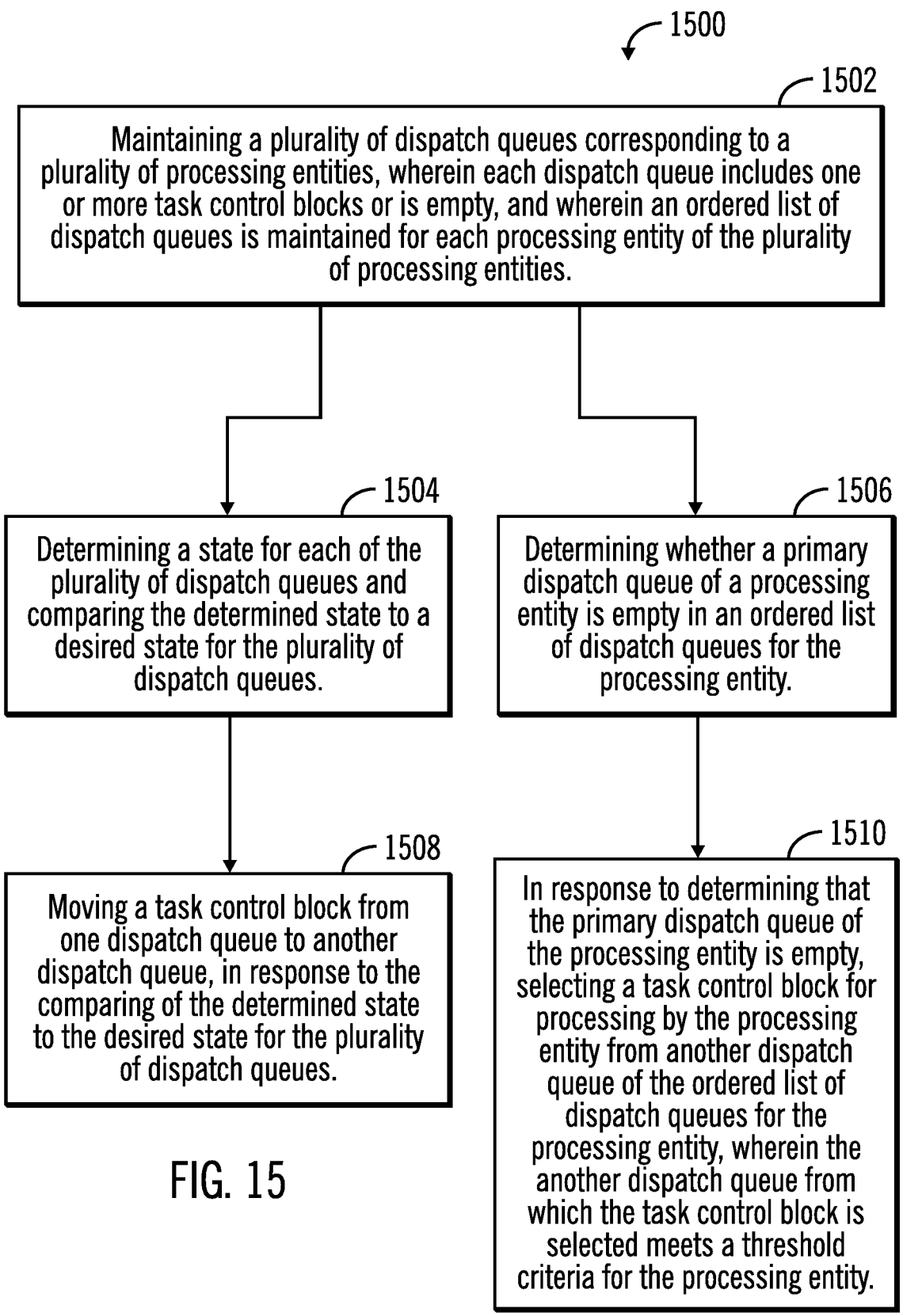
FIG. 15 illustrates a flowchart for balancing dispatch queues in ordered lists of dispatch queues, based on determining the state of the dispatch queues, and also based on a threshold criteria for processing entities, in accordance with certain embodiments.

FIG. 15 illustrates a flowchart for balancing dispatch queues in ordered lists of dispatch queues, based on determining the state of the dispatch queues, and also based on a threshold criteria for processing entities, in accordance with certain embodiments. The operations shown in FIG. 15 may be performed by the TCB manager 1034 that executes in the server 1000.

Control starts at block 1502 in which a plurality of dispatch queues 1036, 1038, 1040, 1042, 1044, 1046 corresponding to a plurality of processing entities 1026, 1028 are maintained, wherein each dispatch queue includes one or more task control blocks or is empty, and wherein an ordered list of dispatch queues 1030, 1032 is maintained for each processing entity of the plurality of processing entities 1026, 1028.

From block 1502 control proceeds in parallel to blocks 1504 and 1506. At block 1506, a state for each of the plurality of dispatch queues is determined (e.g., the determined state is indicated in the measured state variables 1048) and the determined state is compared to a desired state (e.g., the desired state maintained in the desired state variables 1050) for the plurality of dispatch queues 1036, 1038, 1040, 1042, 1044, 1046. A task control block is moved from one dispatch queue to another dispatch queue, in response to the comparing of the determined state to the desired state for the plurality of dispatch queues (at block 1508).

From block 1502 control also proceeds to block 1506, in which a determination is made as to whether a primary dispatch queue 502 (dispatch queue 502 is shown in FIG. 5, where the primary dispatch queue 502 may correspond to one of the dispatch queues 1036, 1038, 1040 that are in the ordered list 1030 of the processing entity 1026) of a processing entity is empty in an ordered list of dispatch queues for the processing entity. In response to determining that the primary dispatch queue 502 of the processing entity is empty, a task control block is selected (at block 1510) for processing by the processing entity from another dispatch queue of the ordered list of dispatch queues for the processing entity, wherein the another dispatch queue from which the task control block is selected meets a threshold criteria for the processing entity as described in FIGS. 1-9.

In certain embodiments that relate to the operations shown in blocks 1502, 1504, 1506, determining the state for each of the plurality of dispatch queues comprises determining an average wait time for task control blocks in each of the plurality of dispatch queues, and in further embodiments a number of task control blocks are moved from a first dispatch queue whose average wait time for task control blocks is greatest among the plurality of dispatch queues to a second dispatch queue whose average wait time for task control blocks is least among the plurality of dispatch queues (as shown in operations shown in FIGS. 13-14). The number of task control blocks moved attempts to equalize the number of task control blocks in the first dispatch queue and the second dispatch queue.

In further embodiments, determining the state for each of the plurality of dispatch queues further comprises determining an arrival rate for task control blocks in each of the plurality of dispatch queues; determining an average number of task control blocks in each of the plurality of dispatch queues; and determining a service rate for task control blocks in each of the plurality of dispatch queues (as shown in FIG. 11). In certain embodiments a selected dispatch queue is allocated specifically to identified processing units that are resident on a same module (as shown in FIG. 5).

Therefore, FIGS. 1-15 illustrate certain embodiments in which overloading of dispatch queues are reduced by moving TCBs from one dispatch queue to another.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 16:
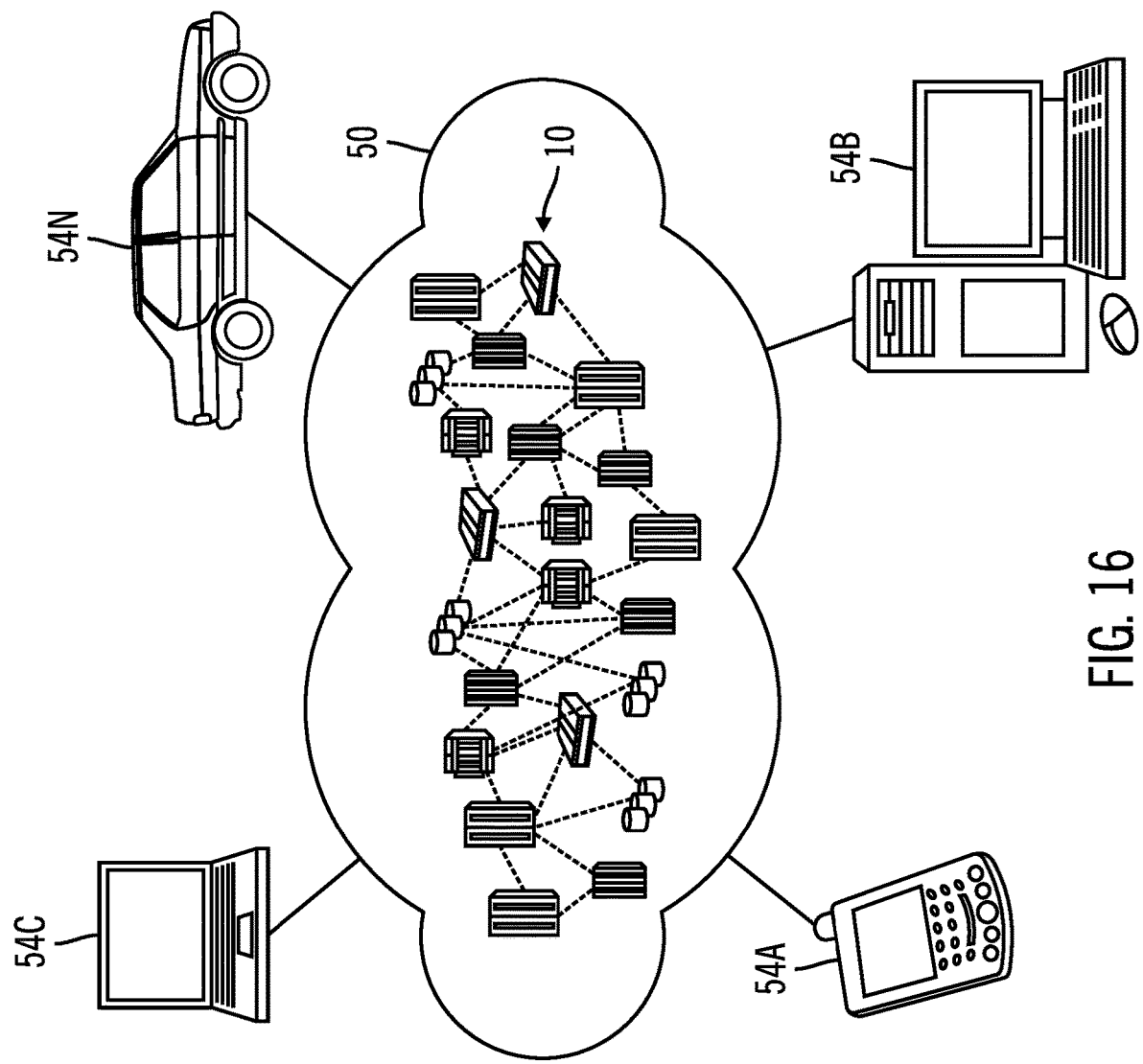
FIG. 16 illustrates a block diagram of a cloud computing environment, in accordance with certain embodiments.

Referring now to FIG. 16, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
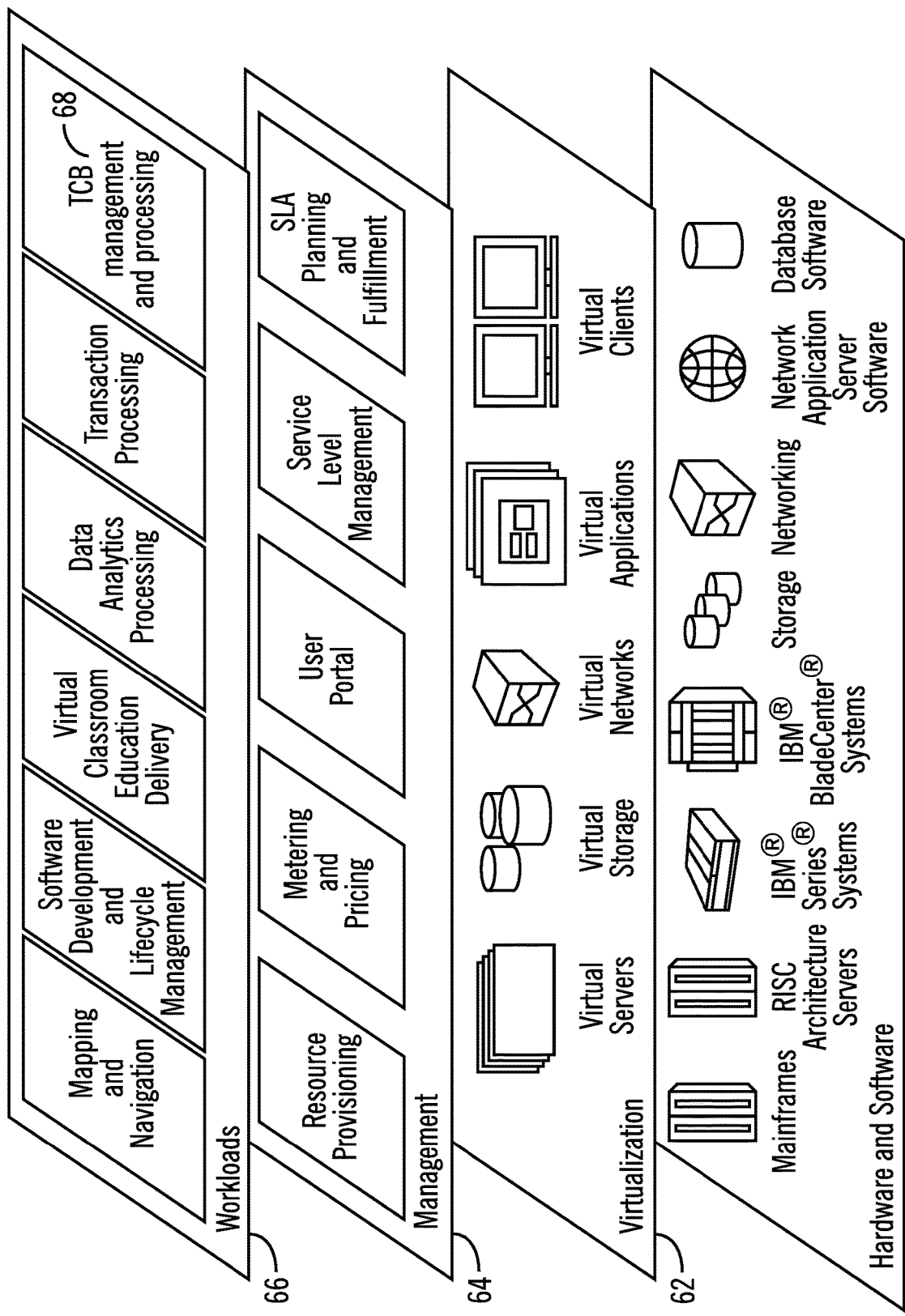
FIG. 17 illustrates a block diagram of further details of the cloud computing environment of FIG. 16, in accordance with certain embodiments.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

\* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the TCB management and processing 68 as shown in FIGS. 1-16.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 18:
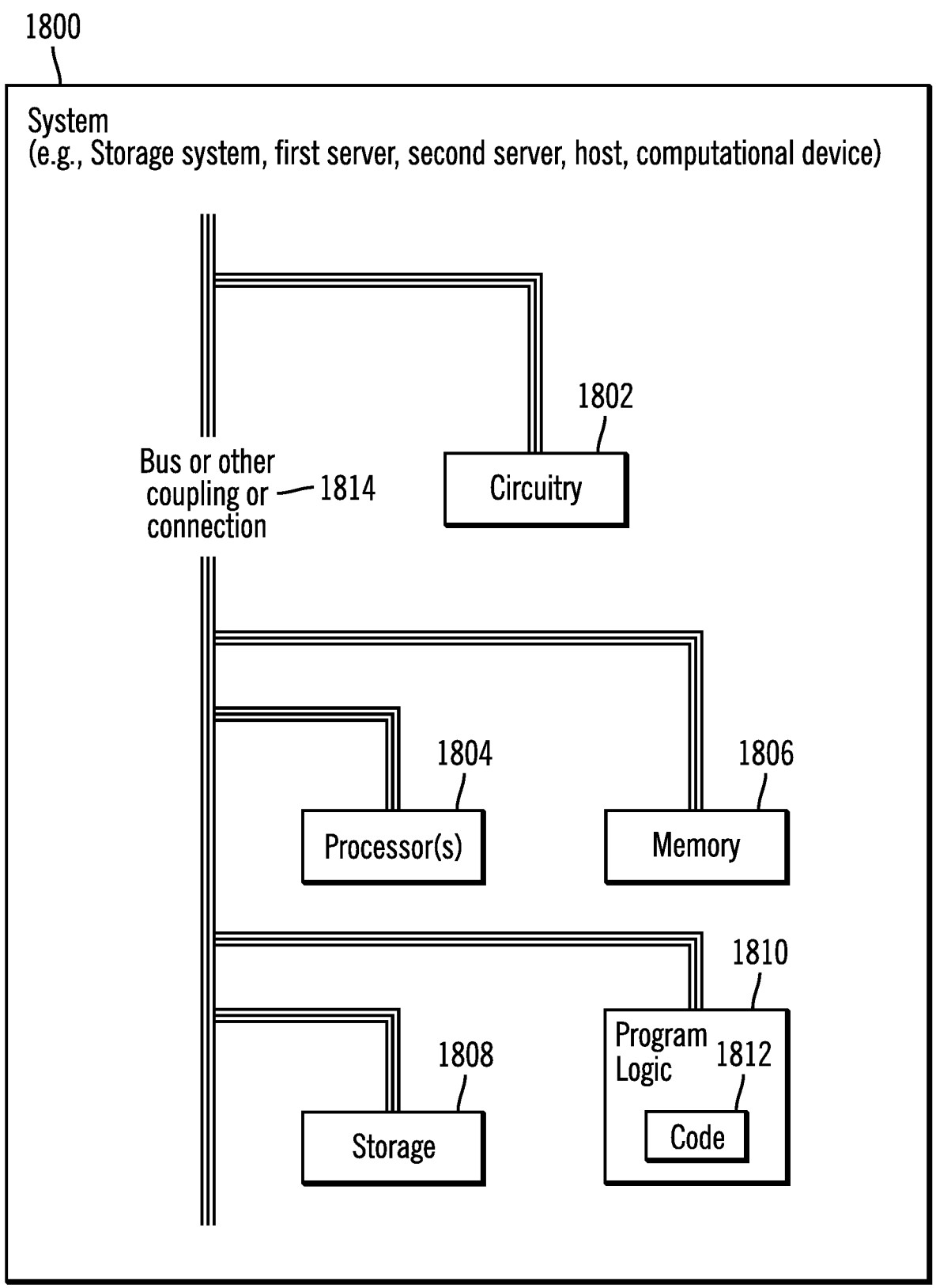
FIG. 18 illustrates a block diagram of a computational system that shows certain elements that may be included in the storage system, servers, and/or the host(s), as described in FIGS. 1-17, in accordance with certain embodiments.

FIG. 18 illustrates a block diagram that shows certain elements that may be included in the storage system 102, the first server 104, the second server 106, and the hosts 108, 110 or other computational devices 1000 in accordance with certain embodiments. The system 1800 may include a circuitry 1802 that may in certain embodiments include at least a processor 1804. The system 1800 may also include a memory 1806 (e.g., a volatile memory device), and storage 1808. The storage 1808 may include a non-volatile memory device (e.g., EEPROM, ROM, PROM, flash, firmware, programmable logic, etc.), magnetic disk drive, optical disk drive, tape drive, etc. The storage 1808 may comprise an internal storage device, an attached storage device and/or a network accessible storage device. The system 1800 may include a program logic 1810 including code 1812 that may be loaded into the memory 1806 and executed by the processor 1804 or circuitry 1802. In certain embodiments, the program logic 1810 including code 1812 may be stored in the storage 1808. In certain other embodiments, the program logic 1810 may be implemented in the circuitry 1802. One or more of the components in the system 1800 may communicate via a bus or via other coupling or connection 1814. Therefore, while FIG. 18 shows the program logic 1810 separately from the other elements, the program logic 1810 may be implemented in the memory 1806 and/or the circuitry 1802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining a plurality of dispatch queues corresponding to a plurality of processing entities, wherein each dispatch queue includes one or more task control blocks or is empty, and wherein an ordered list of dispatch queues is maintained for each processing entity of the plurality of processing entities;
   determining average wait times for task control blocks in each of the plurality of dispatch queues to determine a first dispatch queue that has a highest average wait time among the plurality of dispatch queues, a second dispatch queue that has a second highest average wait time among the plurality of dispatch queues, and a third dispatch queue that has a least average wait time among the plurality of dispatch queues;
   computing a measure indicative of a first difference between the highest average wait time and the second highest average wait time; and
   in response to determining that the measure is greater than a predetermined threshold, moving a number of task control blocks from the first dispatch queue to the third dispatch queue in an attempt to equalize the number of task control blocks in the first dispatch queue and the third dispatch queue, wherein the number of task control blocks that are moved from the first dispatch queue to the third dispatch queue is proportional to the measure indicative of the first difference between the highest average wait time and the second highest average wait time, wherein the first difference between the highest average wait time and the second highest average wait time exceeds a second difference between the second highest average wait time and the least average wait time, and wherein the first difference and the second difference have different numerical values.

2. The method of claim 1, wherein determining a state for each of the plurality of dispatch queues comprises:
   determining an arrival rate for task control blocks in each of the plurality of dispatch queues;
   determining an average number of task control blocks in each of the plurality of dispatch queues; and
   determining a service rate for task control blocks in each of the plurality of dispatch queues.

3. The method of claim 1, wherein a selected dispatch queue is allocated specifically to identified processing units that are resident on a same module.

4. The method of claim 3, the method further comprising:
   determining whether a primary dispatch queue of a processing entity is empty in an ordered list of dispatch queues for the processing entity; and
   in response to determining that the primary dispatch queue of the processing entity is empty, selecting a task control block for processing by the processing entity from another dispatch queue of the ordered list of dispatch queues for the processing entity, wherein the another dispatch queue from which the task control block is selected meets a threshold criteria for the processing entity.

5. The method of claim 1, wherein a third difference between the highest average wait time and the least average wait time exceeds the second highest average wait time.

6. A system, comprising:
   a memory; and
   a processor coupled to the memory, wherein the processor performs operations, the operations comprising:
   maintaining a plurality of dispatch queues corresponding to a plurality of processing entities, wherein each dispatch queue includes one or more task control blocks or is empty, and wherein an ordered list of dispatch queues is maintained for each processing entity of the plurality of processing entities;
   determining average wait times for task control blocks in each of the plurality of dispatch queues to determine a first dispatch queue that has a highest average wait time among the plurality of dispatch queues, a second dispatch queue that has a second highest average wait time among the plurality of dispatch queues, and a third dispatch queue that has a least average wait time among the plurality of dispatch queues;
   computing a measure indicative of a first difference between the highest average wait time and the second highest average wait time; and
   in response to determining that the measure is greater than a predetermined threshold, moving a number of task control blocks from the first dispatch queue to the third dispatch queue in an attempt to equalize the number of task control blocks in the first dispatch queue and the third dispatch queue, wherein the number of task control blocks that are moved from the first dispatch queue to the third dispatch queue is proportional to the measure indicative of the first difference between the highest average wait time and the second highest average wait time, wherein the first difference between the highest average wait time and the second highest average wait time exceeds a second difference between the second highest average wait time and the least average wait time, and wherein the first difference and the second difference have different numerical values.

7. The system of claim 6, wherein determining a state for each of the plurality of dispatch queues comprises:
   determining an arrival rate for task control blocks in each of the plurality of dispatch queues;
   determining an average number of task control blocks in each of the plurality of dispatch queues; and
   determining a service rate for task control blocks in each of the plurality of dispatch queues.

8. The system of claim 6, wherein a selected dispatch queue is allocated specifically to identified processing units that are resident on a same module.

9. The system of claim 8, the operations further comprising:
   determining whether a primary dispatch queue of a processing entity is empty in an ordered list of dispatch queues for the processing entity; and
   in response to determining that the primary dispatch queue of the processing entity is empty, selecting a task control block for processing by the processing entity from another dispatch queue of the ordered list of dispatch queues for the processing entity, wherein the another dispatch queue from which the task control block is selected meets a threshold criteria for the processing entity.

10. The system of claim 6, wherein a third difference between the highest average wait time and the least average wait time exceeds the second highest average wait time.

11. A computer program product, the computer program product comprising a computer readable storage medium having computer readable program code embodied therewith, the computer readable program code configured to perform operations, the operations comprising:

maintaining a plurality of dispatch queues corresponding to a plurality of processing entities, wherein each dispatch queue includes one or more task control blocks or is empty, and wherein an ordered list of dispatch queues is maintained for each processing entity of the plurality of processing entities;

determining average wait times for task control blocks in each of the plurality of dispatch queues to determine a first dispatch queue that has a highest average wait time among the plurality of dispatch queues, a second dispatch queue that has a second highest average wait time among the plurality of dispatch queues, and a third dispatch queue that has a least average wait time among the plurality of dispatch queues;

computing a measure indicative of a first difference between the highest average wait time and the second highest average wait time; and in response to determining that the measure is greater than a predetermined threshold, moving a number of task control blocks from the first dispatch queue to the third dispatch queue in an attempt to equalize the number of task control blocks in the first dispatch queue and the third dispatch queue, wherein the number of task control blocks that are moved from the first dispatch queue to the third dispatch queue is proportional to the measure indicative of the first difference between the highest average wait time and the second highest average wait time, wherein the first difference between the highest average wait time and the second highest average wait time exceeds a second difference between the second highest average wait time and the least average wait time, and wherein the first difference and the second difference have different numerical values.

12. The computer program product of claim 11, wherein determining a state for each of the plurality of dispatch queues comprises:

determining an arrival rate for task control blocks in each of the plurality of dispatch queues;

determining an average number of task control blocks in each of the plurality of dispatch queues; and determining a service rate for task control blocks in each of the plurality of dispatch queues.

13. The computer program product of claim 11, wherein a selected dispatch queue is allocated specifically to identified processing units that are resident on a same module, the operations further comprising:

determining whether a primary dispatch queue of a processing entity is empty in an ordered list of dispatch queues for the processing entity; and in response to determining that the primary dispatch queue of the processing entity is empty, selecting a task control block for processing by the processing entity from another dispatch queue of the ordered list of dispatch queues for the processing entity, wherein the another dispatch queue from which the task control block is selected meets a threshold criteria for the processing entity.

14. The computer program product of claim 11, wherein a third difference between the highest average wait time and the least average wait time exceeds the second highest average wait time.

* * * * *